(12) United States Patent
Kong et al.

(10) Patent No.: US 12,341,919 B2
(45) Date of Patent: Jun. 24, 2025

(54) ANTENNA AND ELECTRONIC DEVICE INCLUDING THE SAME

(71) Applicant: Samsung Electronics Co., Ltd., Suwon-si (KR)

(72) Inventors: Myeongjun Kong, Suwon-si (KR); Shinho Yoon, Suwon-si (KR); Dongjun Oh, Suwon-si (KR); Jinwoo Jung, Suwon-si (KR); Jaebong Chun, Suwon-si (KR); Soonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 17/716,682

(22) Filed: Apr. 8, 2022

(65) Prior Publication Data
US 2022/0321687 A1 Oct. 6, 2022

Related U.S. Application Data

(63) Continuation of application No. PCT/KR2022/004851, filed on Apr. 5, 2022.

(30) Foreign Application Priority Data

Apr. 5, 2021 (KR) .................. 10-2021-0043878

(51) Int. Cl.
*H04M 1/02* (2006.01)
*H01Q 1/24* (2006.01)

(52) U.S. Cl.
CPC .......... *H04M 1/0277* (2013.01); *H01Q 1/243* (2013.01); *H04M 1/0237* (2013.01);
(Continued)

(58) Field of Classification Search
CPC ............. H04M 1/0277; H04M 1/0237; H04M 1/0268; H04M 2201/06; H04M 2201/38; H01Q 1/243
(Continued)

(56) References Cited

U.S. PATENT DOCUMENTS 6,558,192 B1 * 5/2003 Kuo ................... H01R 13/6335
439/541.5
10,936,017 B1 3/2021 Choi et al.
(Continued)

FOREIGN PATENT DOCUMENTS

CN 110417957 A 11/2019
JP 4413145 B2 2/2010
(Continued)

OTHER PUBLICATIONS

International Search Report and written opinion dated Jul. 11, 2022, in International Application No. PCT/KR2022/004851.
(Continued)

*Primary Examiner* — Jean A Gelin
(74) *Attorney, Agent, or Firm* — Jefferson IP Law, LLP

(57) ABSTRACT

An electronic device is provided. The electronic device includes a first housing including a first space and a conductive portion formed through at least a portion of a first side member, a second housing slidably coupled to the first housing in a first direction, at least partially overlapped with the first side member in a slide-in state, and including a second side member including a second space, a flexible display disposed to receive support from the first housing and the second housing and in which a display area at least partially varies when the electronic device is changed from the slide-in state to a slide-out state, a wireless communication circuit disposed in the first space and configured to transmit or receive a wireless signal in at least one frequency
(Continued)

band through the conductive part, and a conductive wall fixed to at least a portion of the first housing and disposed to be electrically connected to a ground between the first side member and the second side member, wherein the conductive wall may be disposed to overlap the conductive portion when the first side member is viewed from the outside.

22 Claims, 21 Drawing Sheets

(52) U.S. Cl.
CPC ...... *H04M 1/0268* (2013.01); *H04M 2201/06* (2013.01); *H04M 2201/38* (2013.01)

(58) Field of Classification Search
USPC ..................................................... 455/575.4
See application file for complete search history.

(56) References Cited

U.S. PATENT DOCUMENTS

| | | | | |
|---|---|---|---|---|
| 11,184,987 | B1* | 11/2021 | Jung | ........................ G01D 5/12 |
| 11,790,866 | B1* | 10/2023 | Wakimoto | ........... G09G 3/3611 |
| | | | | 348/625 |
| 2011/0095962 | A1 | 4/2011 | Ishii | |
| 2012/0087065 | A1 | 4/2012 | Kim et al. | |
| 2014/0240178 | A1 | 8/2014 | Chun et al. | |
| 2017/0023979 | A1* | 1/2017 | Yamazaki | ............. G06F 1/1652 |
| 2017/0346164 | A1* | 11/2017 | Kim | .................... H04M 1/0266 |
| 2019/0140342 | A1* | 5/2019 | Lim | .......................... H01Q 1/42 |
| 2019/0280375 | A1* | 9/2019 | Ahn | .......................... H01Q 1/38 |
| 2020/0264660 | A1 | 8/2020 | Song et al. | |
| 2021/0135492 | A1 | 5/2021 | Kim et al. | |
| 2021/0219437 | A1* | 7/2021 | Kim | .................... H04M 1/0237 |
| 2023/0028294 | A1* | 1/2023 | Kim | .......................... G06F 1/16 |

FOREIGN PATENT DOCUMENTS

| | | |
|---|---|---|
| JP | 5234003 B2 | 7/2013 |
| KR | 10-2006-0016369 A | 2/2006 |
| KR | 10-1094770 B1 | 12/2011 |
| KR | 10-2014-0105886 A | 9/2014 |
| KR | 10-2019-0115888 A | 10/2019 |
| KR | 10-2019-0143029 A | 12/2019 |
| KR | 10-2020-0117741 A | 10/2020 |

OTHER PUBLICATIONS

Extended European Search Report dated May 31, 2024, issued in European Application No. 22784908.0-1201.
Saudi Arabia Office Action dated Jan. 7, 2025, issued in Saudi Arabian Patent Application No. 523450820.

* cited by examiner

ANTENNA AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/004851, filed on Apr. 5, 2022, which is based on and claims the benefit of a Korean patent application number 10-2021-0043878, filed on Apr. 5, 2021, in the Korean Intellectual Property Office, the disclosure of which is incorporated by reference herein in its entirety.

TECHNICAL FIELD

The disclosure relates to an electronic device including an antenna.

BACKGROUND ART

Electronic devices are gradually being thinner, and are being developed to increase rigidity thereof, to strengthen design aspects thereof, and to differentiate functional elements thereof. Electronic devices are being gradually transformed from a uniform rectangular shape into various shapes. The electronic device may have a transformable structure capable of using a large screen display while being convenient to carry. For example, as part of a transformable structure, the electronic device may have an operating structure (e.g., rollable structure or rolling structure) capable of implementing various display forms of a flexible display through support of a plurality of housings foldably coupled to each other. Such an electronic device may include an antenna capable of always maintaining a specified radiation performance regardless of a transformable structure of the housings.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may include a transformable rollable electronic device (e.g., slidable electronic device) capable of extending a display area. The rollable electronic device may include a first housing (e.g., first housing structure, base housing, base bracket, or base structure) and a second housing (e.g., second housing structure, slide housing, slide bracket, or slide structure) that may be movably coupled to each other in an at least partially fitted together manner. For example, the first housing and the second housing may slidably operate with respect to each other and support at least a portion of a flexible display or an expandable display, thus, the first housing and the second housing may induce the flexible display to have a first display area in a slide-in state and induce the flexible display to have a second display area larger than the first display area in a slide-out state.

The rollable electronic device may include at least one antenna operating in a specified frequency band. Such at least one antenna may be formed through, for example, at least one conductive part disposed in at least a portion of the first housing.

However, when the rollable electronic device is changed from the slide-in state to the slide-out state or from the slide-out state to the slide-in state, the conductive part of the first housing may be close to be coupled to or be spaced apart from the conductive structure (e.g., conductive side member) of the second housing, thus, a deviation in an operating frequency band of the antenna may occur, thereby reducing a radiation performance.

Aspects of the disclosure are to address at least the above-mentioned problems and/or disadvantages and to provide at least the advantages described below. Accordingly, an aspect of the disclosure is to provide an antenna configured to always maintain a specified radiation performance regardless of a slide-in/slide-out operation, and an electronic device including the same.

However, the problems to be solved in the disclosure are not limited to the above-mentioned problems, and may be variously expanded without departing from the spirit and scope of the disclosure.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first housing including a conductive part formed through at least a portion of a first side member and a first space, a second housing slidably coupled to the first housing in a first direction, at least partially overlapped with the first side member in a slide-in state, and including a second side member including a second space, a flexible display disposed to receive support from the first housing and the second housing and in which a display area at least partially varies when the electronic device is changed from the slide-in state to a slide-out state, a wireless communication circuit disposed in the first space and configured to transmit and/or receive a wireless signal in at least one frequency band through the conductive part, and a conductive wall fixed to at least a portion of the first housing and disposed to be electrically connected to a ground between the first side member and the second side member, wherein the conductive wall is disposed to overlap the conductive part when the first side member is viewed from the outside.

In accordance with another aspect of the disclosure, an electronic device is provided. The electronic device includes a first housing including a first conductive part, a second housing slidably coupled to the first housing in a first direction, at least partially overlapped with the first housing in a slide-in state, and including at least one conductive structure, a flexible display disposed to receive support from the first housing and the second housing and in which a display area at least partially varies when the electronic device is changed from the slide-in state to the slide-out state, a wireless communication circuit disposed in an internal space of the first housing and configured to transmit and/or receive a wireless signal in at least one frequency band through the first conductive part, and a conductive wall disposed in the first housing to correspond to the first conductive part between the first housing and the second housing and electrically connected to a ground, wherein the conductive wall has a shape overlapped with the first conductive part when the first housing is viewed from the outside.

Advantageous Effects

An electronic device according to various embodiments of the disclosure includes a conductive wall disposed between a conductive part used as an antenna of a first housing and a conductive structure (e.g., conductive side member) of a second housing, thus, an antenna always operating in a specified frequency band is provided through the conductive wall regardless of a slide-in/slide-out operation thereof, thereby receiving help in improving reliability of the electronic device.

Further, various effects directly or indirectly identified through this document can be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings in which.

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
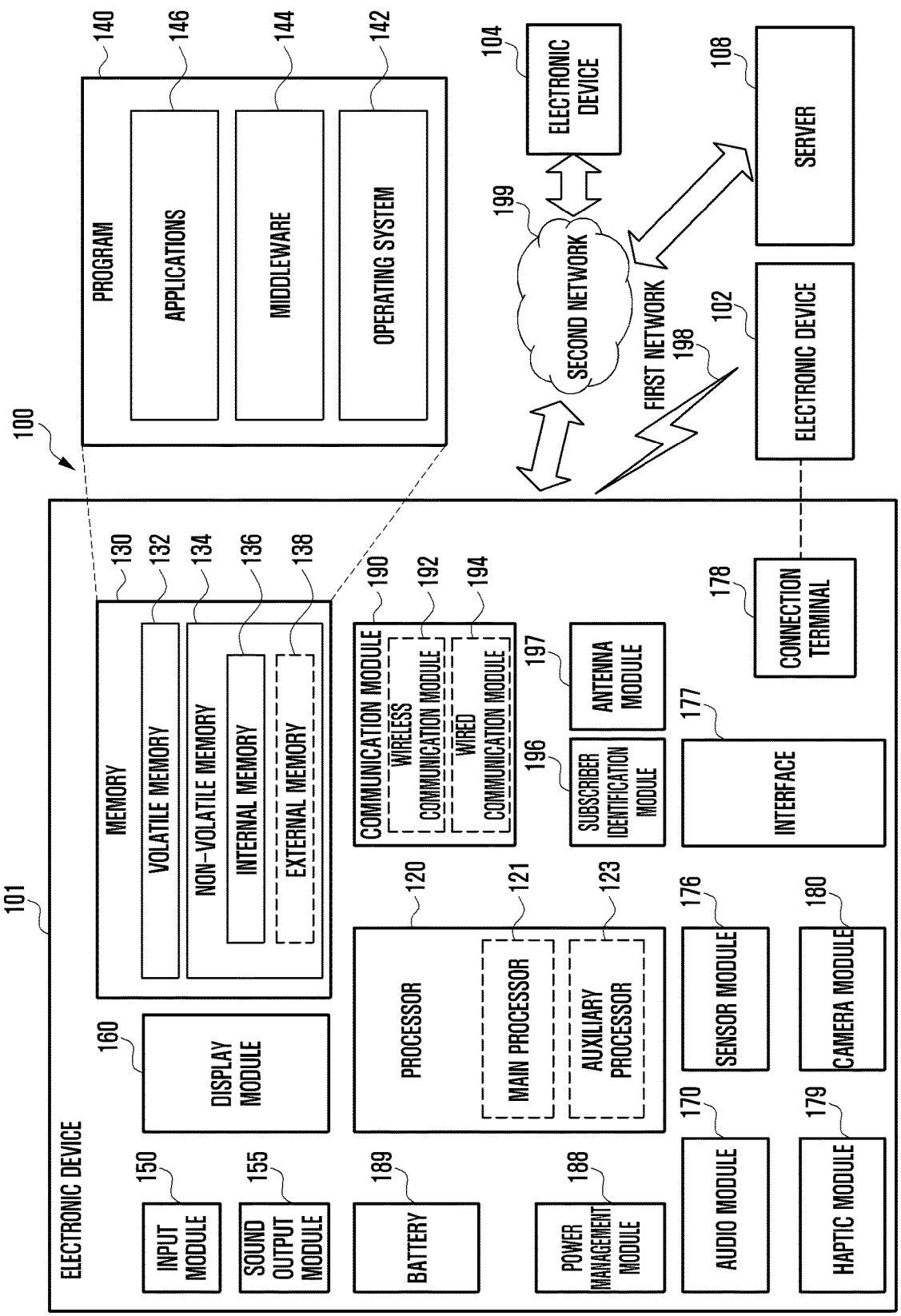
FIG. 1 is a block diagram illustrating an electronic device in a network environment according to an embodiment of the disclosure.

FIG. 1 illustrates an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The non-volatile memory 134 includes an internal memory 136 and may include an external memory 138. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
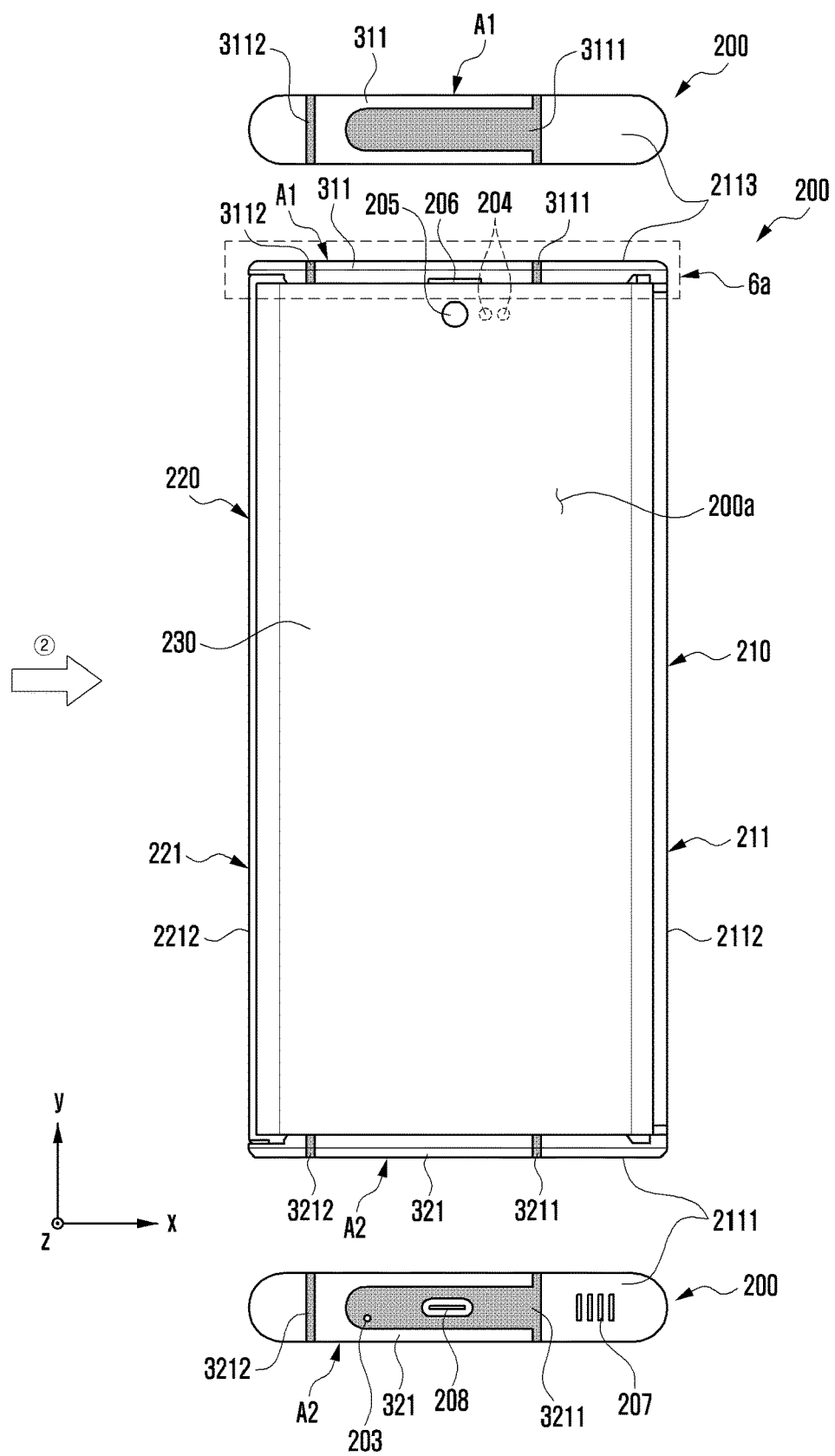
FIGS. 2A and 2B are diagrams illustrating a front surface and a rear surface of an electronic device in a slide-in state according to various embodiments of the disclosure.
Figure 2B:
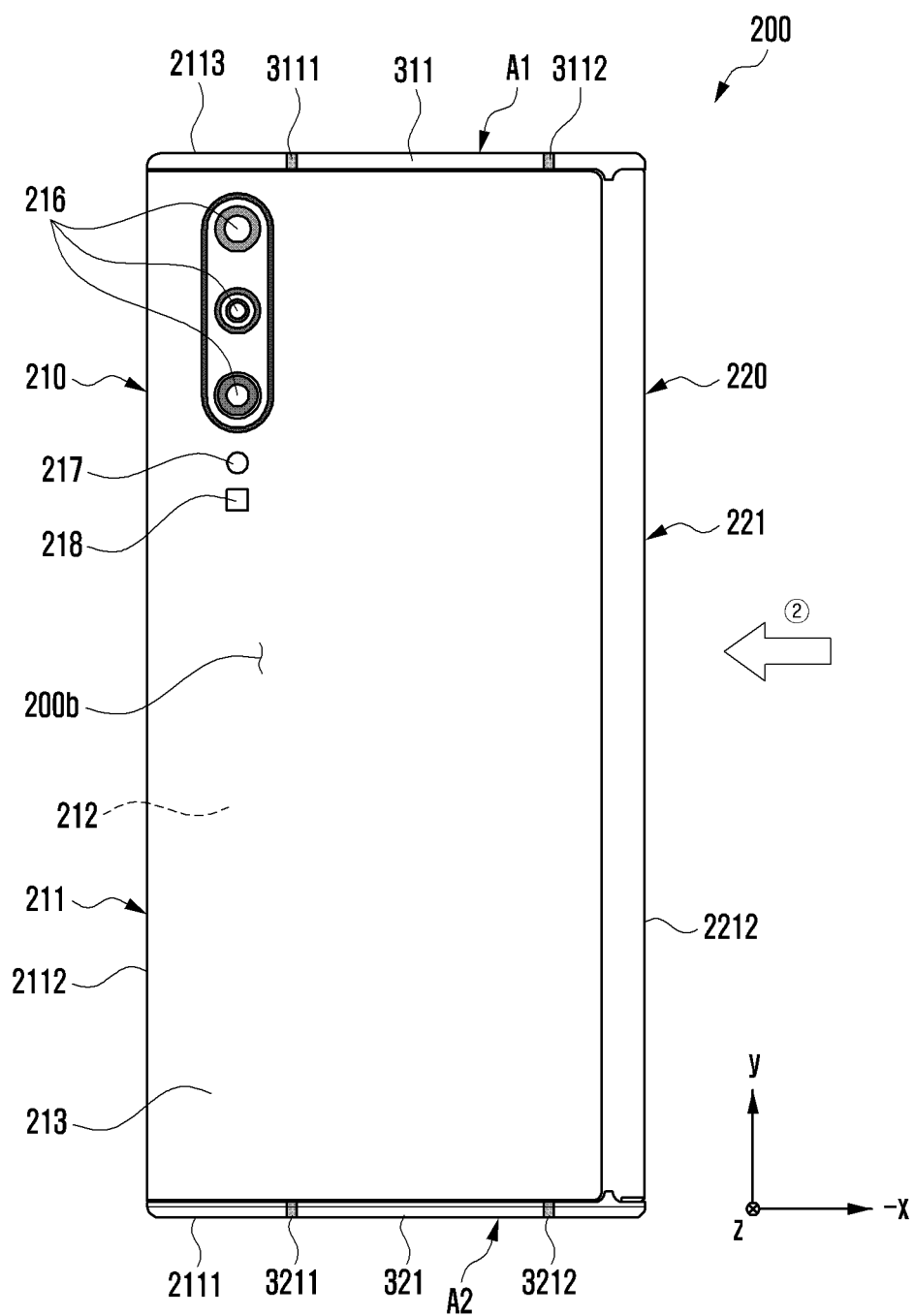
Figure 3A:
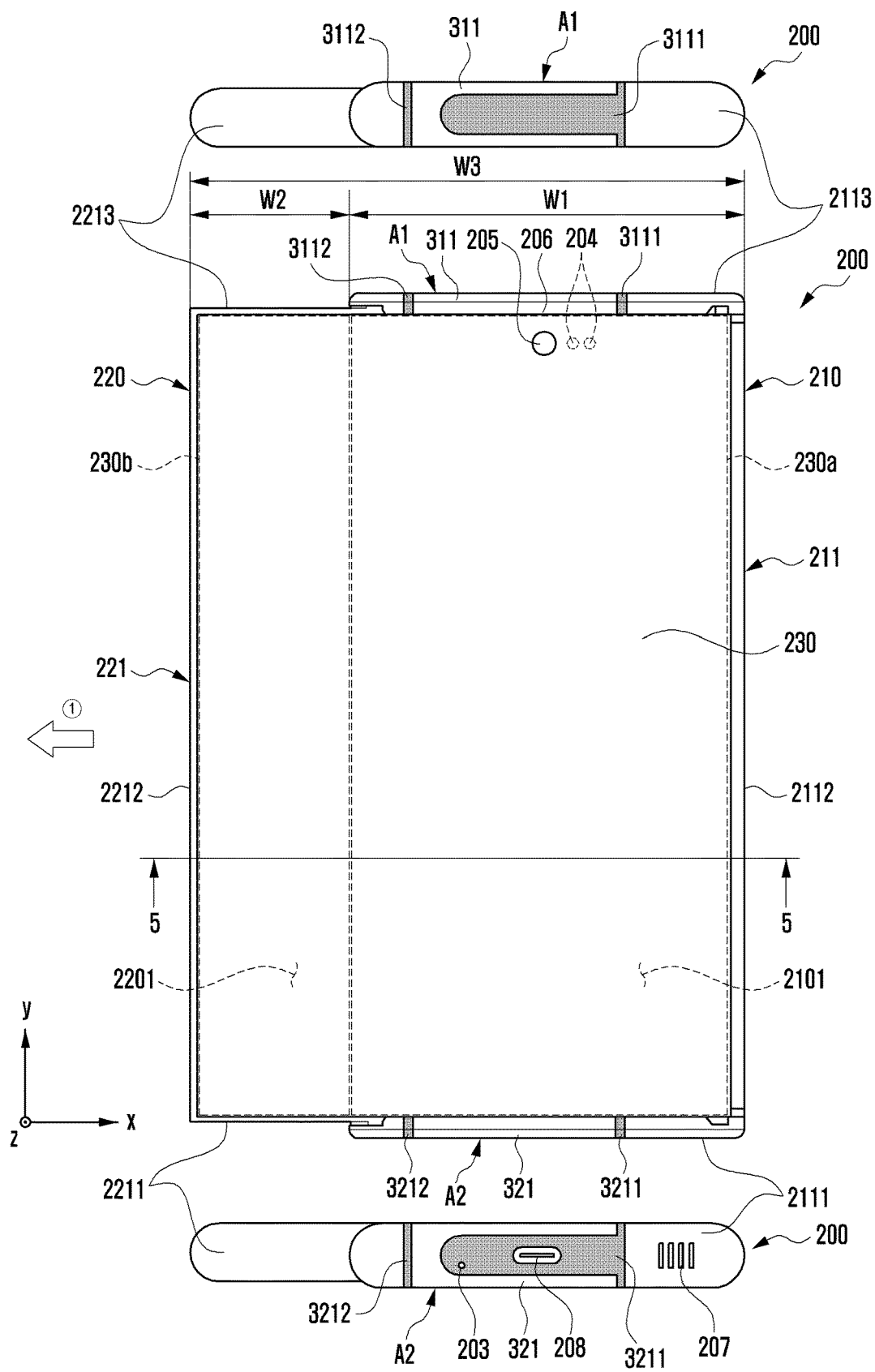
FIGS. 3A and 3B are diagrams illustrating a front surface and a rear surface of an electronic device in a slide-out state according to various embodiments of the disclosure.
Figure 3B:
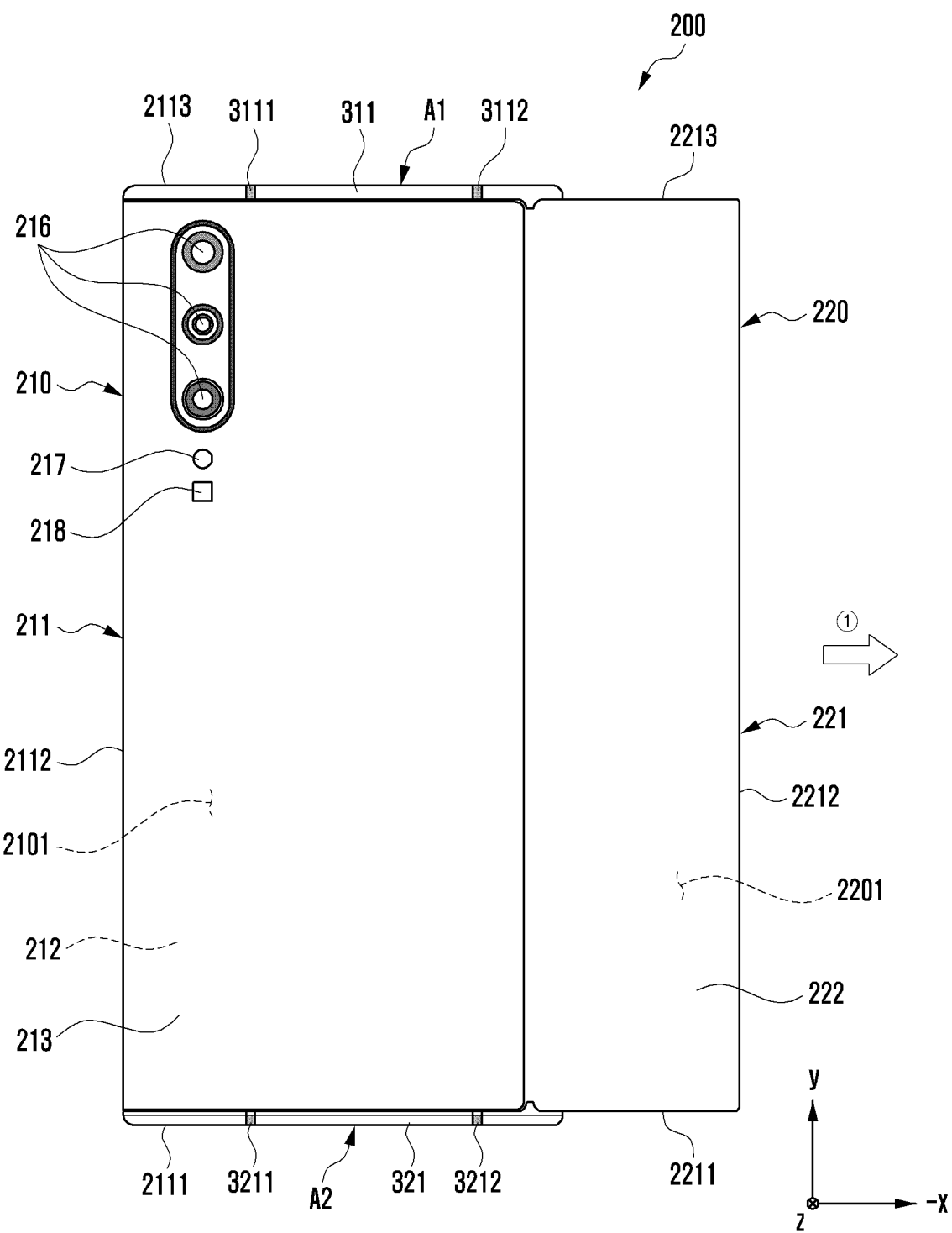

FIGS. 2A and 2B are diagrams illustrating a front surface and a rear surface of an electronic device in a slide-in state according to various embodiments of the disclosure. FIGS. 3A and 3B are diagrams illustrating a front surface and a rear surface of an electronic device in a slide-out state according to various embodiments of the disclosure.

An electronic device 200 of FIGS. 2A, 2B, 3A, and 3B may be at least partially similar to the electronic device 101 of FIG. 1 or may further include other components of the electronic device.

Referring to FIGS. 2A, 2B, 3A, and 3B, the electronic device 200 may include a first housing 210 (e.g., first housing structure or base housing), a second housing 220 (e.g., second housing structure or slide housing) moveably coupled to a specified reciprocating distance in a specified direction (e.g., x-axis direction) from the first housing 210, and a flexible display 230 (e.g., expandable display) disposed to be supported through at least a portion of the first housing 210 and the second housing 220. According to an embodiment, at least a portion of the second housing 220 may be received in a first space 2101 of the first housing 210, thereby being changed to a slide-in state. According to an embodiment, the electronic device 200 may include a bendable member or a bendable support member (e.g., a bendable member 240 of FIG. 5) (e.g., polyarticular hinge module) at least partially forming the same plane as at least a portion of the first housing 210 in a slide-out state and at least partially received in a second space 2201 of the second housing 220 in a slide-in state. According to an embodiment, at least a portion of the flexible display 230 may be received in the internal space (e.g., the second space 2201 of FIG. 5) of the second housing 220 while being supported by the bendable member (e.g., the bendable member 240 of FIG. 5) in the slide-in state, thereby being disposed invisibly from the outside. According to an embodiment, at least a portion of the flexible display 230 may be disposed to be visible from the outside while receiving support from the bendable member (e.g., the bendable member 240 of FIG. 5) forming at least partially the same plane as the first housing 210 in a slide-out state.

According to various embodiments, the electronic device 200 may include a front surface 200a (e.g., first surface), a rear surface 200b (e.g., second surface) facing in a direction opposite to that of the front surface 200a, and a side surface (not illustrated) enclosing a space between the front surface 200a and the rear surface 200b. According to an embodiment, the electronic device 200 may include a first housing 210 including a first side member 211 and a second housing 220 including a second side member 221. According to an embodiment, the first side member 211 may include a first side surface 2111 having a first length in a first direction (e.g., x-axis direction), a second side surface 2112 extended to have a second length greater than the first length in a direction (e.g., y-axis direction) substantially perpendicular to the first side surface 2111, and a third side surface 2113 extended substantially parallel to the first side surface 2111 from the second side surface 2112 and having a first length. According to an embodiment, the first side member 211 may be at least partially made of a conductive material (e.g., metal). According to an embodiment, at least a portion of the first side member 211 may include a first support member 212 extended to at least a portion of the first space 2101 of the first housing 210.

According to various embodiments, the second side member 221 may include a fourth side surface 2211 at least partially corresponding to the first side surface 2111 and having a third length, a fifth side surface 2212 extended in a direction substantially parallel to the second side surface 2112 from the fourth side surface 2211, and having a fourth length greater than the third length, and a sixth side surface 2213 extended to correspond to the third side surface 2113 from the fifth side surface 2212 and having a third length. According to an embodiment, the second side member 221 may be at least partially made of a conductive material (e.g., metal). According to an embodiment, at least a portion of the second side member 221 may include a second support member 222 extended to at least a portion of the second space 2201 of the second housing 220. According to an embodiment, the first side surface 2111 and the fourth side surface 2211, and the third side surface 2113 and the sixth side surface 2213 may be slidably coupled to each other. According to an embodiment, in the slide-in state, the fourth side surface 2211 may overlap the first side surface 2111, thereby being disposed to be invisible from the outside. According to an embodiment, in the slide-in state, the sixth side surface 2213 may overlap the third side surface 2113, thereby being disposed to be invisible from the outside. In some embodiments, in the slide-in state, at least a portion of the fourth side surface 2211 and the sixth side surface 2213 may overlap at least a portion of the first side surface 2111 and the third side surface 2113, thereby being disposed to be at least partially visible from the outside. According to an embodiment, in the slide-in state, the second support member 222 may overlap the first support member 212, thereby being disposed invisibly from the outside. In some embodiments, in the slide-in state, at least a portion of the second support member 222 may overlap the first support member 212, thereby being disposed invisibly from the outside, and the remaining portion thereof may be disposed to be visible from the outside. According to an embodiment, the electronic device may include a rear cover 213 disposed in at least a portion of the first housing 210 at the rear surface 200b. According to an embodiment, the rear cover 213 may be disposed through at least a portion of the first support member 212. In some embodiments, the rear cover 213 may be integrally formed with the first side members 211. According to an embodiment, the rear cover 213 may be made of a polymer, coated or tinted glass, ceramic, metal (e.g., aluminum, stainless steel (STS), or magnesium), or a combination of at least two of the above materials. In some embodiments, the rear cover 213 may be extended to at least a portion of the first side member 211. In some embodiments, at least a portion of the first support member 212 may be replaced with the rear cover 213. In some embodiments, the electronic device 200 may be disposed in at least a portion of the second support member 222 in the second housing 220 or may include another rear cover replaced with at least a portion of the second support member 222.

According to various embodiments, the electronic device 200 may include a flexible display 230 disposed to receive support from at least a portion of the first housing 210 and the second housing 220. According to an embodiment, the flexible display 230 may include a first portion 230a (e.g., flat portion) always visible from the outside and a second portion 230b (e.g., bendable portion) extended from the first portion 230a and at least partially received in the internal space 2201 of the second housing 220 so as to be invisible from the outside in the slide-in state. According to an embodiment, the first portion 230a may be disposed to receive support from the first housing 210, and the second portion 230b may be disposed to receive at least partially support from a bendable member (e.g., the bendable member 240 of FIG. 5). According to an embodiment, the flexible display 230 may be extended from the first portion 230a while receiving support from the bendable member (e.g., the bendable member 240 of FIG. 5) in a state in which the second housing 220 is slide out in a designated direction (direction ①), form a substantially same plane as the first portion 230a, and be disposed to be visible from the outside. According to an embodiment, the second portion 230b of the flexible display 230 may be slid in the second space 2201 of the second housing 220 in a state in which the second housing 220 is slide out in a designated direction (direction ②) and be disposed to be invisible from the outside.

Accordingly, as the second housing 220 moves in a sliding manner from the first housing 210 in a specified direction (e.g., x-axis direction), the electronic device 200 may induce a display area of the flexible display 230 to vary.

According to various embodiments, the first housing 210 and the second housing 220 may be operated in a sliding manner so that an overall width is changed with respect to each other. According to an embodiment, the electronic device 200 may be configured to have a first width W1 from the second side surface 2112 to the fourth side surface 2211 in the slide-in state. According to an embodiment, in the slide-out state, as at least a portion of a bendable member (e.g., the bendable member 240 of FIG. 5) received in the second space 2201 of the second housing 220 is moved to have an additional second width W2, the electronic device 200 may be configured to have a third width W3 larger than the first width W1. For example, the flexible display 230 may have a display area substantially corresponding to the first width W1 in the slide-in state, and have an extended display area substantially corresponding to the third width W3 in the slide-out state.

According to various embodiments, the slide-out operation of the electronic device 200 may be performed through a user's manipulation. For example, the second housing 220 may be slid out in a designated direction (direction ①) through manipulation of a locker (e.g., slide-out button) (not illustrated) exposed through the rear surface 200b of the electronic device. In this case, the locker may be disposed in the first housing 210 and control the second housing 220 in order to maintain the second housing 220 always pressed in the slide-out direction (direction ①) through the support assembly (e.g., a support assembly 260 of FIG. 4) in the slide-in state. In some embodiments, the electronic device 200 may be changed from the slide-in state to the slide-out state through a user's manipulation of pressing an outer surface of the flexible display 230 in a specified direction (direction ①). In some embodiments, the second housing 220 may be operated automatically through a drive mechanism (e.g., drive motor, reduction module, and/or gear assembly) disposed in the first space 2101 of the first housing 210 and/or the second space 2201 of the second housing 220. According to an embodiment, when the electronic device 200 detects an event for a change of the slide-in/slide-output state of the electronic device 200 through a processor (e.g., the processor 120 of FIG. 1), the electronic device 200 may be configured to control an operation of the second housing 220 through a driving mechanism. In some embodiments, the processor (e.g., the processor 120 of FIG. 1) of the electronic device 200 may control the flexible display 230 to display an object in various ways corresponding to the changed display area of the flexible display 230 according to a slide-in state, a slide-out state, or an intermediate state (e.g., including a free stop state) and to execute an application program.

According to various embodiments, the electronic device 200 may include at least one of an input device 203, sound output devices 206 and 207, sensor modules 204 and 217, camera modules 205 and 216, a connector port 208, a key input device (not illustrated), or an indicator (not illustrated) disposed in the first space 2101 of the first housing 210. In another embodiment, the electronic device 200 may be configured such that at least one of the above-described components is omitted or other components are additionally included. In another embodiment, at least one of the above-described components may be disposed in the second space 2201 of the second housing 220.

According to various embodiments, the input device 203 may include a microphone. In some embodiments, the input device 203 may include a plurality of microphones disposed to detect a direction of a sound. The sound output devices 206 and 207 may include speakers. For example, the sound output devices 206 and 207 may include a receiver 206 for a call and an external speaker 207. According to an embodiment, the external speaker 207 may face the outside through at least one speaker hole formed in the first housing 210 in the slide-out state. According to an embodiment, the connector port 208 may face the outside through a connector port hole formed in the first housing 210 in the slide-out state. In some embodiments, the call receiver 206 may include a speaker (e.g., piezo speaker) operating while excluding a separate speaker hole.

According to various embodiments, the sensor modules 204 and 217 may generate an electrical signal or data value corresponding to an internal operating state of the electronic device 200 or an external environmental state. The sensor modules 204 and 217 may include, for example, a first sensor module 204 (e.g., proximity sensor or illuminance sensor) disposed at the front surface 200a of the electronic device 200 and/or a second sensor module 217 (e.g., heart rate monitoring (HRM) sensor) disposed at the rear surface 200b. According to an embodiment, the first sensor module 204 may be disposed under the flexible display 230 at the front surface 200a of the electronic device 200. According to an embodiment, the first sensor module 204 and/or the second sensor module 217 may include at least one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera modules 205 and 216 may include a first camera module 205 disposed at the front surface 200a of the electronic device 200 and a second camera module 216 disposed at the rear surface 200b of the electronic device 200. According to an embodiment, the electronic device 200 may include a flash 218 located near the second camera module 216. According to an embodiment, the camera modules 205 and 216 may include one or a plurality of lenses, an image sensor, and/or an image signal processor. According to an embodiment, the first camera module 205 may be disposed under the flexible display 230 and be configured to photograph a subject through a portion of an active area of the flexible display 230. According to an embodiment, the flash 218 may include, for example, a light emitting diode or a xenon lamp.

According to various embodiments, the first camera module 205 of the camera modules 205 and 216 and some sensor modules 204 of the sensor modules 204 and 217 may be disposed to detect an external environment through the flexible display 230. For example, in the first space 2101 of the first housing 210, the first camera module 205 or some sensor modules 204 may be disposed to contact an external environment through a transmission area or a perforated opening formed in the flexible display 230. According to an embodiment, an area facing the first camera module 205 of the flexible display 230 may be formed as a transmission area having designated transmittance as a part of an area displaying contents. According to an embodiment, the transmission area may be formed to have transmittance in a range of about 5% to about 20%. Such a transmission area may include an area overlapped with an effective area (e.g., view angle area) of the first camera module 205 through which light for generating an image by an image sensor passes. For example, the transmission area of the flexible display 230 may include an area having a lower pixel density and/or wiring density than that of the periphery. For example, the transmission area may replace the aforementioned opening. For example, some camera modules 205 may include an under display camera (UDC). In some embodiments, some sensor modules 204 may be disposed to perform a function thereof without being visually exposed through the flexible display 230 in an internal space of the electronic device 200.

According to various embodiments, the electronic device 200 may include at least one antenna A1 and A2 electrically connected to a wireless communication circuit (e.g., the wireless communication module 192 of FIG. 1) disposed in the first space 2101 of the first housing 210. According to an embodiment, the at least one antenna A1 and A2 may include a first antenna A1 disposed in an upper area of the electronic device 200 and a second antenna A2 disposed in a lower area of the electronic device 200. According to an embodiment, the first antenna A1 may include a first conductive part 311 segmented through at least one non-conductive part 3111 and 3112 at the third side surface 2113 of the first side member 211. According to an embodiment, the first conductive part 311 may be disposed to be segmented through the first non-conductive part 3111 and the second non-conductive part 3112 spaced apart by a predetermined interval, and be electrically connected to the wireless communication circuit (e.g., the wireless communication module 192 of FIG. 1). According to an embodiment, the second antenna A2 may include a second conductive part 321 segmented through at least one non-conductive part 3211 and 3212 at the first side surface 2111 of the first side member 211. According to an embodiment, the second conductive part 321 may be disposed to be segmented through the third non-conductive part 3211 and the fourth non-conductive part 3212 spaced apart by a predetermined interval, and be electrically connected to the wireless communication circuit (e.g., the wireless communication module 192 of FIG. 1). According to an embodiment, the non-conductive parts 3111, 3112, 3211, and 3212 may include the first conductive part 311 and/or the second conductive part 321 and an injection-molded product. According to an embodiment, the first non-conductive part 3111 and/or the second non-conductive part 3112 may be formed in a 'U' shape through the non-conductive parts 3111, 3112, 3211, and 3212. According to an embodiment, the wireless communication circuit (e.g., the wireless communication module 192 of FIG. 1) may be configured to transmit and/or receive a wireless signal in a designated frequency band (e.g., about 800 MHz-6000 MHz) through the first conductive part 311 and/or the second conductive part 321.

According to various embodiments, at least a portion of the second housing 220 may be made of a conductive material. For example, at least a portion of the sixth side surface 2213, the fourth side surface 2211, or the second support member 222 of the second housing 220 may be made of a conductive material, and in a slide-in state of the electronic device 200, the at least a portion may be close to be coupled to the first conductive part 311 and/or the second conductive part 321 used as the antennas A1 and A2, and in the slide-out state of the electronic device 200, the at least a portion may be spaced apart from the first conductive part 311 and/or the second conductive part 321; thus, a deviation may occur in a radiation performance of the antenna, and a performance of the antenna may be reduced.

According to an embodiment of the disclosure, the electronic device 200 may include a conductive wall 270 disposed between the third side surface 2113 of the first housing 210 and the sixth side surface 2213 of the second housing 220, thereby helping the first antenna A1 to exhibit a specified radiation performance regardless of the slide-input/slide-output operation of the electronic device 200. Similarly, the electronic device 200 may include a conductive wall 270 disposed in substantially the same manner between the first side surface 2111 of the first housing 210 and the fourth side surface 2211 of the second housing 220, thereby helping the second antenna A2 to exhibit a specified radiation performance regardless of the slide-input/slide-output operation of the electronic device 200.

Figure 4:
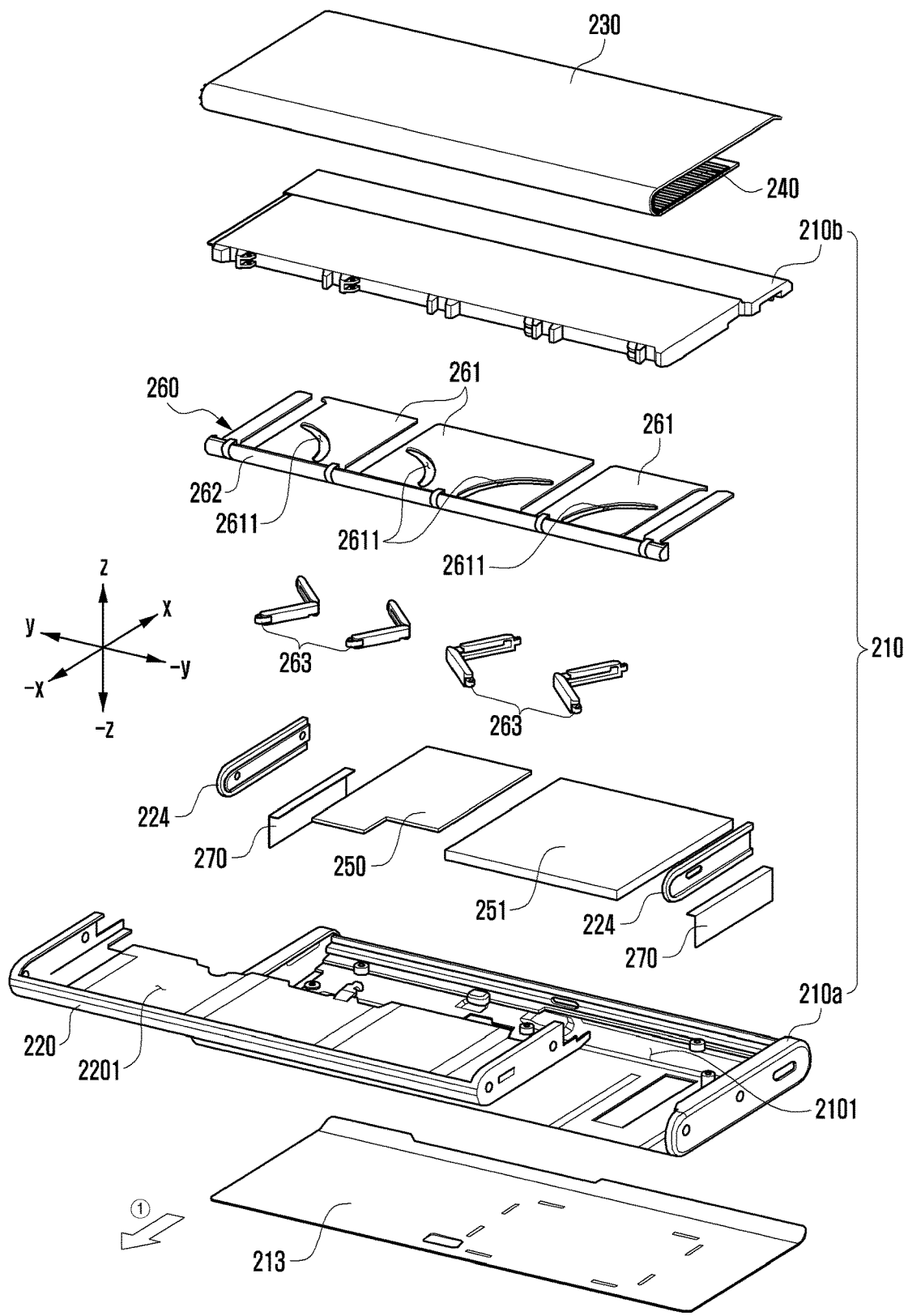
FIG. 4 is an exploded perspective view illustrating an electronic device according to an embodiment of the disclosure.
Figure 5:
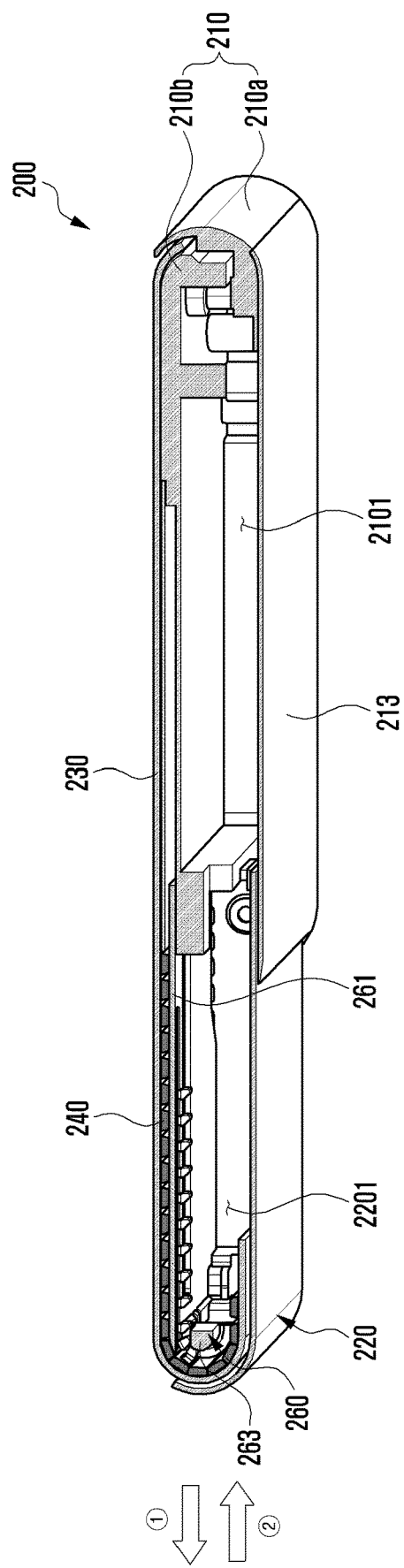
FIG. 5 is a cross-sectional view illustrating an electronic device taken along line 5-5 of FIG. 3A according to an embodiment of the disclosure.

FIG. 4 is an exploded perspective view illustrating an electronic device according to an embodiment of the disclosure. FIG. 5 is a cross-sectional view illustrating an electronic device taken along line 5-5 of FIG. 3A according to an embodiment of the disclosure.

Referring to FIGS. 4 and 5, the electronic device 200 may include a first housing 210 including a first space 2101, a second housing 220 slidably coupled to the first housing 210 and including the second housing 220, a bendable member 240 at least partially rotatably disposed in the second space 2201, and a flexible display 230 disposed to receive support from at least a portion of the bendable member 240 and the first housing 210. According to an embodiment, the first space 2101 of the first housing 210 may be provided through coupling of a first bracket housing 210a and a second bracket housing 210b. In some embodiments, at least a portion of the first bracket housing 210a may include a first support member (e.g., the first support member 212 of FIG. 3B) or may be replaced with the first support member 212. According to an embodiment, the electronic device 200 may include a substrate 250 disposed in the first space 2101 and a battery 251 disposed near the substrate 250. According to an embodiment, the electronic device 200 may include a camera module (e.g., the camera module 216 of FIG. 3A) or a sensor module (e.g., the sensor module 217 of FIG. 3A) disposed in the first space 2101. According to an embodiment, the bendable member 240 may have one end fixed to the first housing 210 and the other end disposed to be movably received at least partially in the second space 2201 of the second housing 220. For example, the bendable member 240 may be at least partially received in the second space 2201 in the slide-in state, and be at least partially slid out from the second space 2201 so as to form a substantially same plane as the first housing 210 (e.g., the second bracket housing 210b) in the slide-out state. Accordingly, a display area of the flexible display 230 supported by the first housing 210 or the bendable member 240 may vary according to a sliding operation. According to an embodiment, the electronic device 200 may further include at least one guide rail 224 disposed between the first housing 210 and the second housing 220 and for inducing a sliding operation of the second housing 220. In some embodiments, the electronic device 200 may further include a cover member (not illustrated) disposed to cover both side surfaces (e.g., the first side surface 2111 and the third side surface 2113 of FIG. 2A) of the first housing 210.

According to various embodiments, the electronic device 200 may include a support assembly 260 disposed to move the second space (e.g., the second space 2201 of FIG. 5) from the first housing 210 and for pressing the second housing 220 in a slide-out direction. According to an embodiment, the support assembly 260 may include a slide plate 261 slidably coupled to the first housing 210 (e.g., the second bracket housing 210b), a pressing part 262 disposed at an end portion of the slide plate 261 and for pressing a rear surface of the bendable member 240, and at least one pressing link 263 having one end fixed to the first housing 210 (e.g., the second bracket housing 210b) and the other end fixed to the pressing part 262 to press the pressing part 262 in the slide-out direction (e.g., −x-axis direction). According to an embodiment, the slide plate 261 may be coupled to the second housing 220, thereby helping to form the second space 2201. According to an embodiment, the at least one pressing part 262 may be integrally formed with the slide plate 261 or may be structurally coupled to the slide plate 261. According to an embodiment, the at least one pressing link 263 may be guided along a guide slit 2611 formed in the slide plate 261. According to an embodiment, each of the at least one pressing link 263 may include at least two unit links connected to open through an elastic member (e.g., torsion spring), and provide a pressing force to the pressing part 262 in the slide-out direction (e.g., −x-axis direction) through a force of the unit links to open. According to an embodiment, the support assembly 260 may provide a pressing force for always pressing the second housing 220 in the slide-out direction (e.g., −x axis direction), and support the bendable member 240 during operation, thereby helping to reduce a drooping phenomenon of the flexible display 230.

According to various embodiments, the electronic device 200 may include at least one conductive wall 270 disposed between the first housing 210 and the second housing 220. According to an embodiment, the at least one conductive wall 270 may be disposed between the third side surface (e.g., the third side surface 2113 of FIG. 3A) of the first housing 210 and the sixth side surface (e.g., the sixth side surface 2213 of FIG. 3A) of the second housing 220, thereby reducing a decrease in a radiation performance of the first antenna (e.g., the first antenna A1 of FIG. 3A) through the first conductive part (e.g., the first conductive part 311 of FIG. 3A) disposed in at least a portion of the third side surface (e.g., the third side surface 2113 of FIG. 3A). According to an embodiment, the at least one conductive wall 270 may be disposed between the first side surface (e.g., the first side surface 2111 of FIG. 3A) of the first housing 210 and the fourth side surface (e.g., the fourth side surface 2211 of FIG. 3A) of the second housing 220, thereby reducing a decrease in a radiation performance of the second antenna (e.g., the second antenna A1 of FIG. 3A) through a second conductive part (e.g., the second conductive part 321 of FIG. 3A) disposed in at least a portion of the first side surface (e.g., the first side surface 2111 of FIG. 3A).

Hereinafter, a disposition structure of the first antenna A1 through the conductive wall 270 will be described in detail. Because a disposition structure of the second antenna A2 through the conductive wall 270 is substantially the same as that of the first antenna A1, a detailed description thereof may be omitted.

Figure 6A:
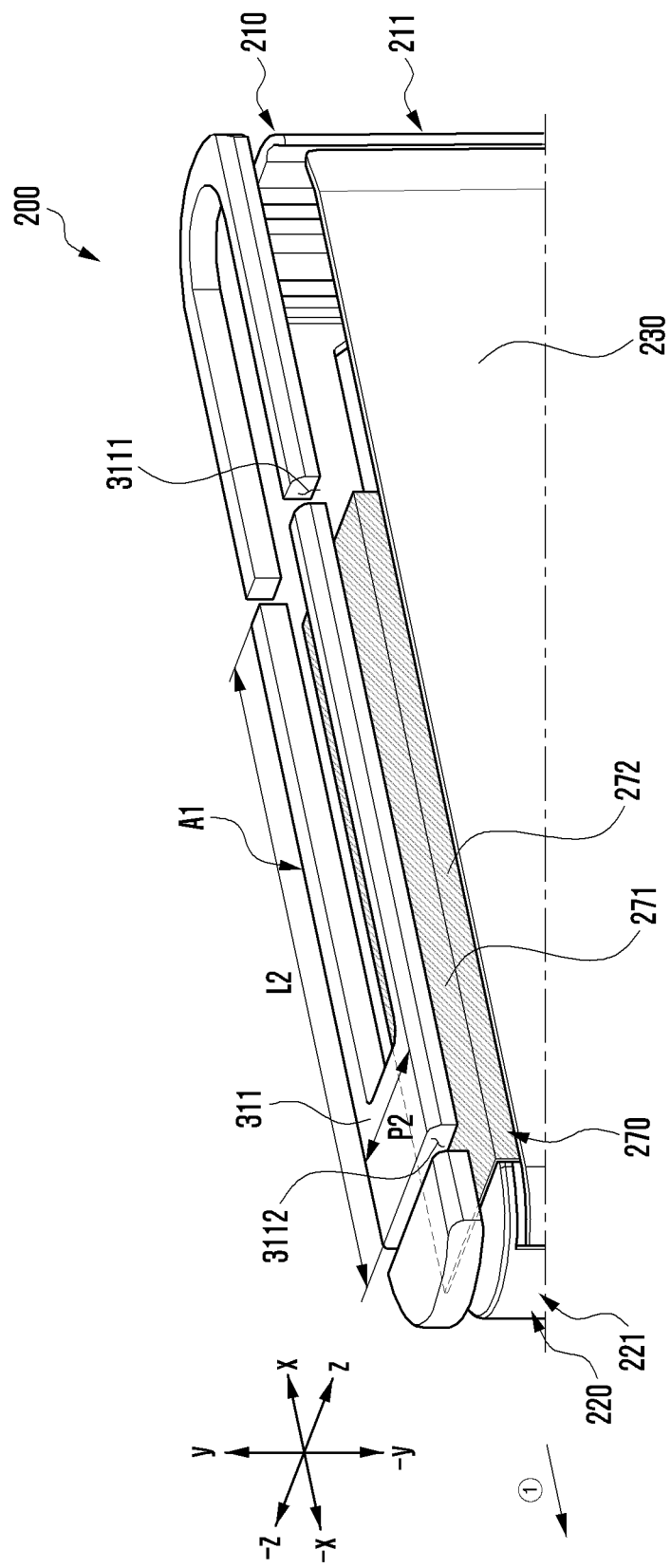
FIG. 6A is a diagram of a partial constitution of an electronic device illustrating an area 6a of FIG. 2A according to an embodiment of the disclosure.
Figure 6B:
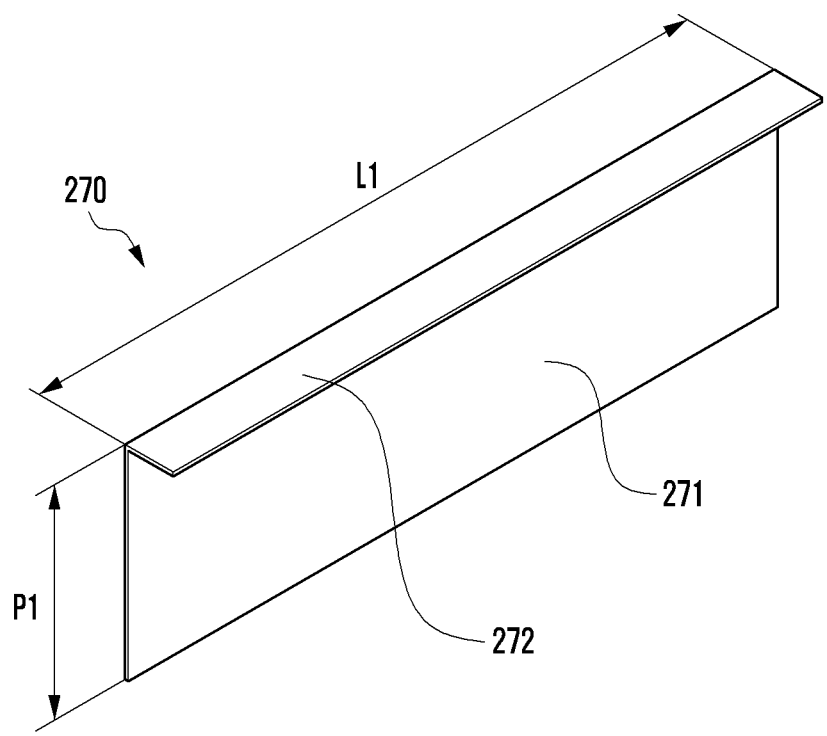
FIG. 6B is a perspective view illustrating a conductive wall according to an embodiment of the disclosure.

FIG. 6A is a diagram of a partial configuration of an electronic device illustrating an area 6a of FIG. 2A according to an embodiment of the disclosure. FIG. 6B is a perspective view illustrating a conductive wall according to an embodiment of the disclosure.

Referring to FIGS. 6A and 6B, the electronic device 200 may include a first housing 210 including a first side member 211, a second housing 220 disposed to slide out from the first housing 210 in a designated direction (direction (D) and including a second side member 221, and a flexible display 230 disposed to receive support from the first housing 210 and the second housing 220. According to an embodiment, the electronic device 200 may include a first conductive part 311 disposed through at least a portion of the first side member 211. According to an embodiment, the first conductive part 311 may be disposed to be electrically isolated from a peripheral conductive structure through at least one non-conductive part 3111 and 3112. According to an embodiment, the first conductive part 311 may be electrically connected to a wireless communication circuit (e.g., the wireless communication module 192 of FIG. 1) disposed in the first housing 210, thereby operating as the first antenna A1 in a designated frequency band.

According to various embodiments, the electronic device 200 may include a conductive wall 270 disposed between the first side member 211 of the first housing 210 and the second side member 221 of the second housing 220. According to an embodiment, the conductive wall 270 is a thin metal plate and may be disposed in the first housing 210. For example, the conductive wall 270 may be fixed to at least a portion of the first side member 211 of the first housing 210 through a bonding process such as soldering, bonding, or fusion bonding. According to an embodiment, when the first housing 210 is viewed from the outside, the conductive wall 270 may be formed to have a size and/or shape overlapped with at least the first conductive part 311. This is to reduce a coupling phenomenon in which the second side member 221 made of a conductive material affects the first conductive part 311 in a slide-in state.

According to various embodiments, the conductive wall 270 may include a plate part 271 disposed in a floating state in a space between the first side member 211 of the first housing 210 and the second side member 221 of the second housing 220 and a bent part 272 bent at a specified bending angle (e.g., about 90 degrees) from the plate part 271. According to an embodiment, the bent part 272 may be fixed to the first space (e.g., the first space 2101 of FIG. 4) of the first housing 210. According to an embodiment, the bent part 272 may be disposed at an appropriate location of the first bracket housing (e.g., the first bracket housing 210a of FIG. 4) or the second bracket housing (e.g., the second bracket housing 210b of FIG. 4) of the first housing 210. According to an embodiment, the bent part 272 may be disposed to be electrically connected to the ground of the electronic device 200. In this case, the bent part 272 may be fixed to a portion of the conductive first side member 211 of the first housing 210 electrically connected to the ground of the substrate (e.g., the substrate 250 of FIG. 4) through soldering. In some embodiments, the bent part 272 may be fixed to the non-conductive part of the first housing 210 and be electrically connected to the ground of the substrate (e.g., the substrate 250 of FIG. 4) through an electrical connection member (e.g., C clip, conductive tape, or conductive bonding). In some embodiments, the conductive wall 270 may include a flexible substrate (e.g., flexible printed circuit board (FPCB)) including a plate-shaped conductive pattern enclosed by a dielectric sheet, and the flexible substrate may be disposed in a manner in which it is attached to an inner surface of the first housing 210 or an outer surface of the second housing 220 between the first housing 210 and the second housing 220. According to an embodiment, the bent part 272 may be formed to have a sufficient amount of bending that may be fixed to a designated location of the first housing 210.

According to various embodiments, a length L1 of the conductive wall 270 may be formed substantially equal to or longer than a length L2 of the first conductive part 311. According to an embodiment, lengths of the plate part 271 and the bent part 272 of the conductive wall 270 may be substantially the same. According to an embodiment, a width P1 of the plate part 271 of the conductive wall 270 may be formed substantially equal to or larger than a width P2 of the first conductive part 311. Accordingly, when the first housing 210 is viewed from the outside, the first conductive part 311 may substantially overlap the plate part 271, thereby being covered by the second housing 220. The first antenna A1 formed by the first conductive part 311 is not influenced by the second housing 220 made of a conductive material through a disposition configuration of the conductive wall 270 in the slide-in state and/or the slide-out state; thus, a radiation performance deviation may be reduced.

Figure 6C:
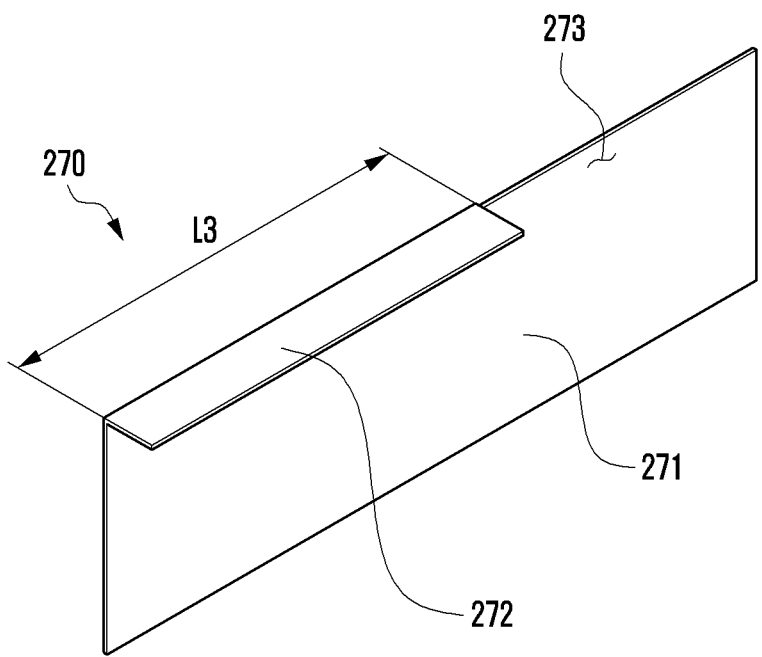
FIG. 6C is a perspective view illustrating a conductive wall according to an embodiment of the disclosure.

FIG. 6C is a perspective view illustrating a conductive wall according to an embodiment of the disclosure.

Referring to FIG. 6C, the conductive wall 270 may be formed such that the plate part 271 and the bent part 272 have different lengths. According to an embodiment, the conductive wall 270 may include a bent part 272 having a length L3 shorter than the length L1 of the plate part 271. In this case, it will be described later, but the length L3 of the bent part 272 may be determined according to a feeding point and a ground point of the first conductive part 311. For example, the length L3 of the bent part 272 may be formed substantially equal to or longer than a distance from the feeding location to the ground point of at least the first conductive part 311. Accordingly, a mounting space of the conductive wall 270 may be efficiently designed through an omitted part 273 of the bent part 272, which may help to make the electronic device 200 thin.

Figure 7A:
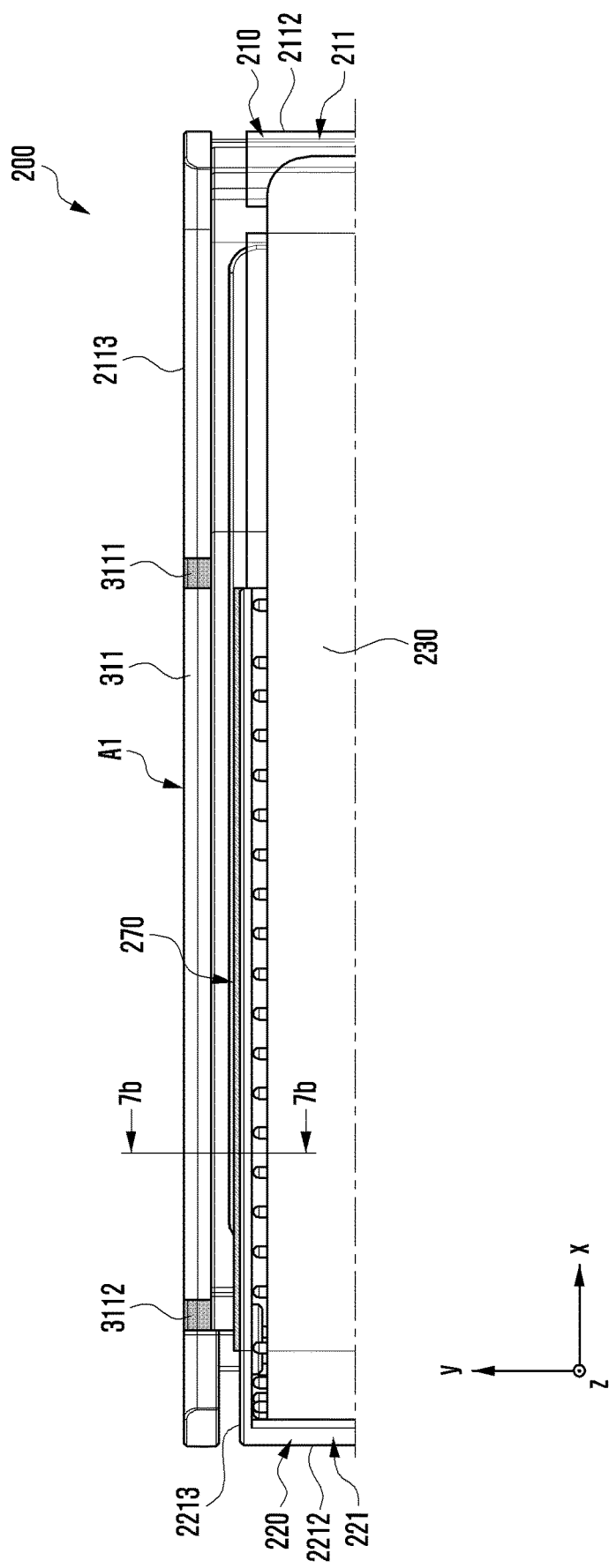
FIG. 7A is a diagram of a partial constitution of an electronic device illustrating disposition of a conductive wall according to an embodiment of the disclosure.
Figure 7B:
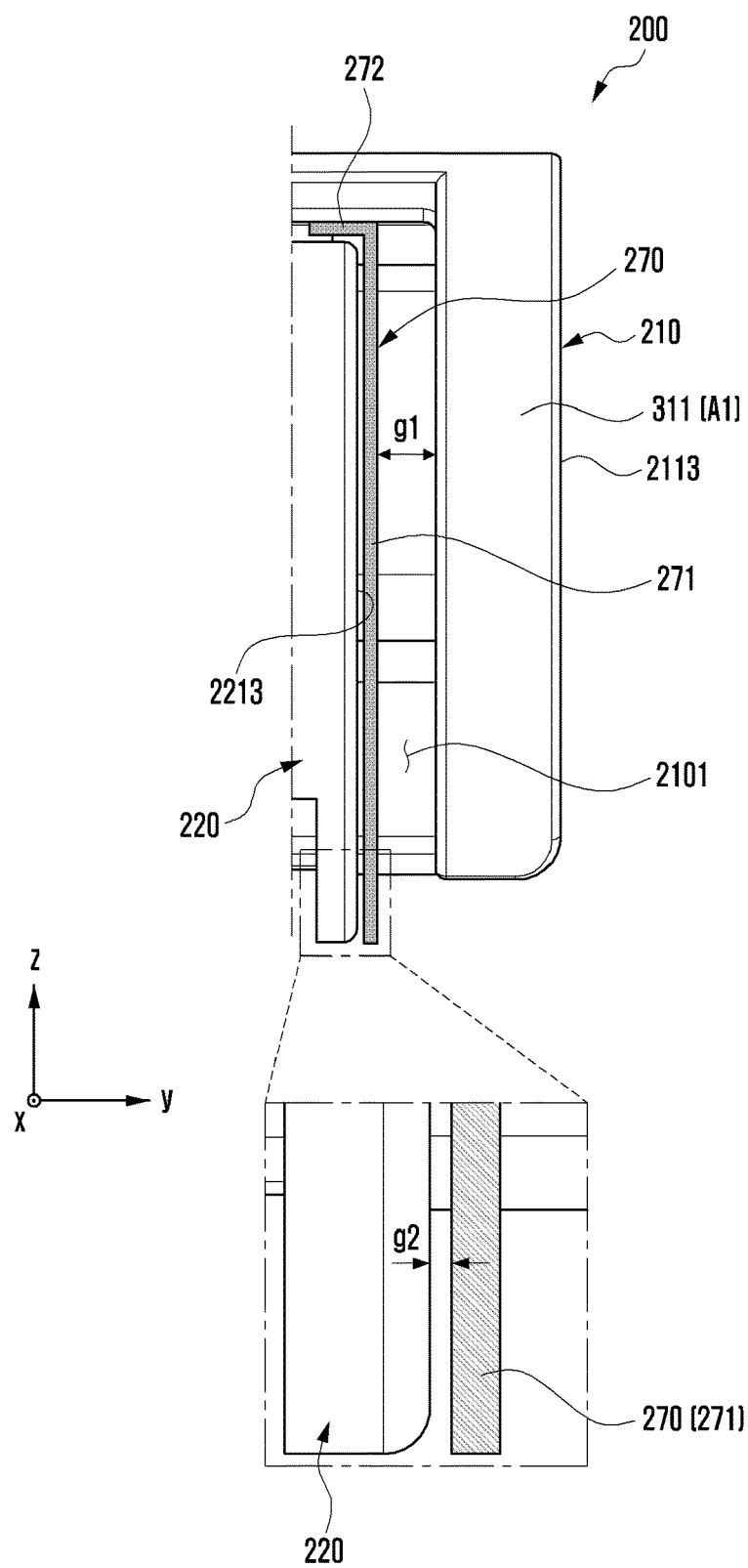
FIG. 7B is a partial cross-sectional view illustrating an electronic device taken along line 7b-7b of FIG. 7A according to an embodiment of the disclosure.

FIG. 7A is a diagram of a partial configuration of an electronic device illustrating disposition of a conductive wall according to an embodiment of the disclosure. FIG. 7B is a partial cross-sectional view illustrating an electronic device taken along line 7b-7b of FIG. 7A according to an embodiment of the disclosure.

Referring to FIGS. 7A and 7B, the electronic device 200 may include a first housing 210 including a first side member 211, a second housing 220 disposed to slide out in a designated direction (−x-axis direction) from the first housing 210 and including a second side member 221, and a flexible display 230 disposed to receive support from the first housing 210 and the second housing 220. According to an embodiment, the electronic device 200 may include a first conductive part 311 disposed through at least a portion of the third side surface 2113 of the first side member 211. According to an embodiment, the first conductive part 311 may be disposed adjacent to the sixth side surface 2213 of the second housing 220 disposed to correspond to the third side surface 2113. According to an embodiment, the first conductive part 311 may be disposed to be electrically isolated from a peripheral conductive structure through at least one non-conductive part 3111 and 3112. According to an embodiment, the first conductive part 311 may be electrically connected to a wireless communication circuit (e.g., the wireless communication module 192 of FIG. 1) disposed in the first housing 210, thereby operating as the first antenna A1 in a designated frequency band.

According to various embodiments, the conductive wall 270 may be disposed between the third side surface 2113 of the first housing 210 and the sixth side surface 2213 of the second housing 220. According to an embodiment, the bent part 272 of the conductive wall 270 may be fixed to at least a portion of the first housing 210. In this case, the plate part 271 of the conductive wall 270 may be disposed to have a specified first gap g1 from the third side surface 2113 of the first side member 211 of the first housing 210. According to an embodiment, the plate part 271 of the conductive wall 270 may be disposed to have a designated second gap g2 from the sixth side surface 2213 of the second side member 221 of the second housing 220. In some embodiments, the first gap g1 may be greater than the second gap g2. In some embodiments, the first gap g1 may be substantially equal to or smaller than the second gap g2. Accordingly, the second housing 220 may not receive interference from the conductive wall 270 during the slide-in/slide-out operation.

Figure 8A:
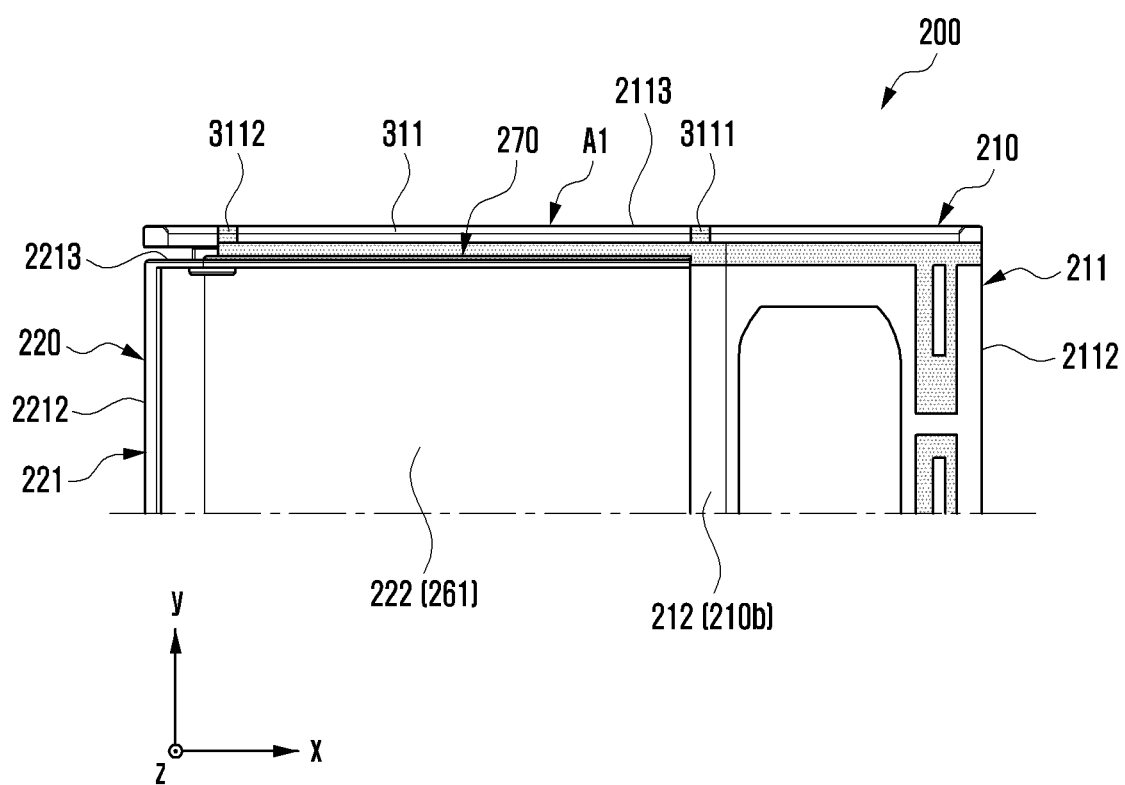
FIG. 8A is a diagram of a partial configuration of an electronic device illustrating disposition of a conductive wall in a slide-in state according to an embodiment of the disclosure.
Figure 8B:
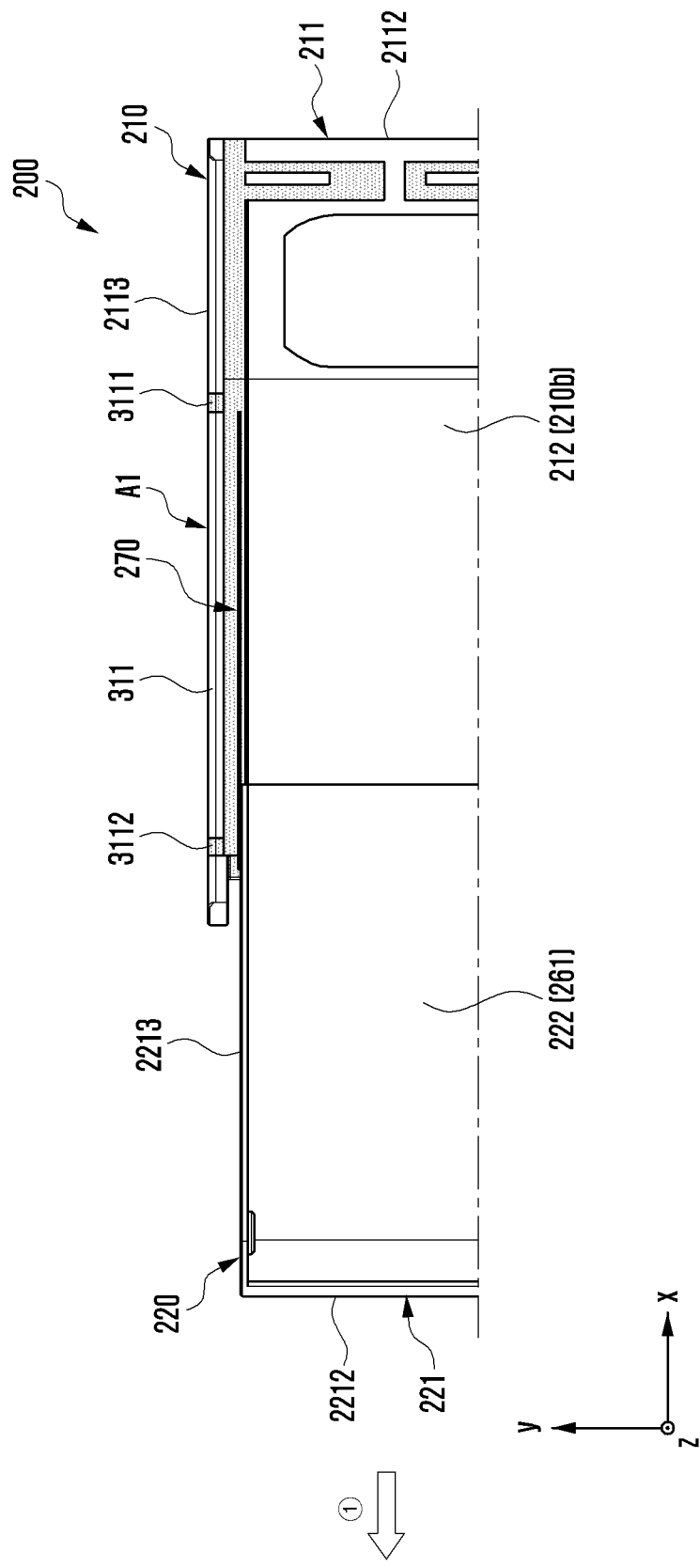
FIG. 8B is a diagram of a partial constitution of an electronic device illustrating disposition of a conductive wall in a slide-out state according to an embodiment of the disclosure.

FIG. 8A is a diagram of a partial configuration of an electronic device illustrating disposition of a conductive wall in a slide-in state according to an embodiment of the disclosure. FIG. 8B is a diagram of a partial configuration of an electronic device illustrating disposition of a conductive wall in a slide-out state according to an embodiment of the disclosure.

Referring to FIGS. 8A and 8B, the electronic device 200 may include a first conductive part 311 formed with at least a portion of the third side surface 2113 of the first housing 210 and operating as the first antenna A1. According to an embodiment, the electronic device 200 may include a conductive wall 270 disposed between the first conductive part 311 disposed at the third side surface 2113 of the first housing 210 and the sixth side surface 2213 of the second housing 220. According to an embodiment, the conductive wall 270 may be fixed to a designated location of the first housing 210. According to an embodiment, the conductive wall 270 may be disposed so that the bent part (e.g., the bent part 272 of FIG. 7B) is fixed to the first housing 210 and the plate part (e.g., the plate part 271 of FIG. 7B) maintains a floating state with the two housings 210 and 220 between the third side surface 2113 of the first housing 210 and the sixth side surface 2213 of the second housing 220. In this case, in the slide-in state, the conductive wall 270 may cover the sixth side surface 2213 made of a conductive material of the second housing 220 with respect to the first conductive part 311, thereby forming new coupling with the first conductive part 311. Further, in the slide-out state, the conductive wall 270 maintains a location thereof, and only the second housing 220 moves in a slide-out direction, so that newly formed coupling does not change, thereby helping to enable the first antenna A1 to maintain a radiation performance in the slide-in state.

Figure 9A:
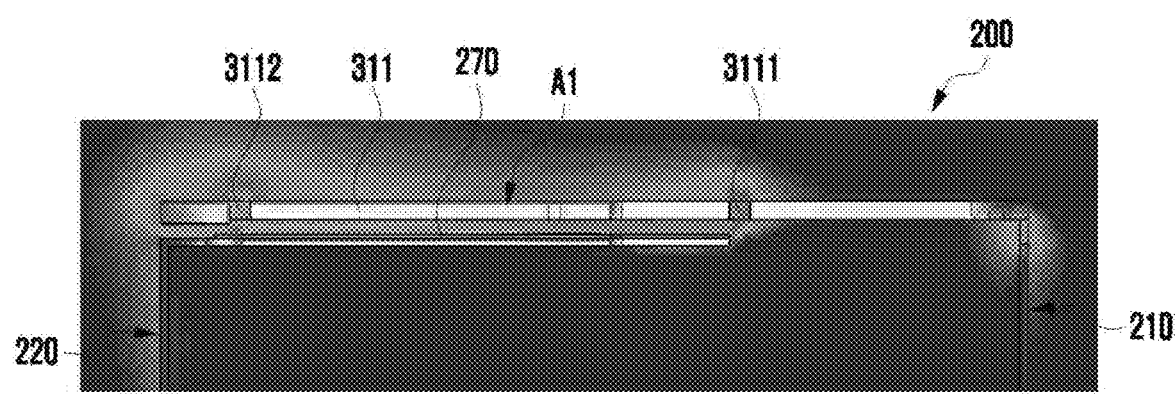
FIGS. 9A and 9B are diagrams illustrating current distribution around an antenna in a slide-in state and a slide-out state of an electronic device according to various embodiments of the disclosure.
Figure 9B:
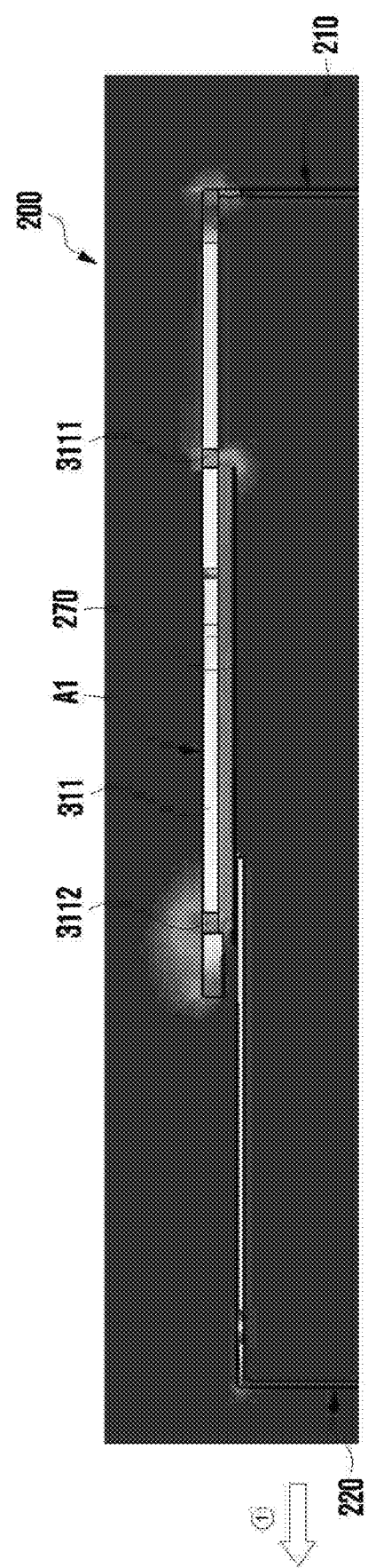

FIGS. 9A and 9B are diagrams illustrating current distribution around an antenna in a slide-in state and a slide-out state of an electronic device according to various embodiments of the disclosure.

Referring to FIGS. 9A and 9B, when the electronic device 200 including the conductive wall 270 disposed between the first housing 210 and the second housing 220 is in a slide-in state and a slide-out state, it can be seen that in the first antenna A1 operating through the first conductive part 311, a constant current distribution (field distribution) occurs between the first non-conductive part 3111 and the second non-conductive part 3112. This may mean that there is no deviation in a radiation performance of the first antenna A1 operating through the first conductive part 311 in the slide-in state and the slide-out state of the electronic device 200.

Figure 10:
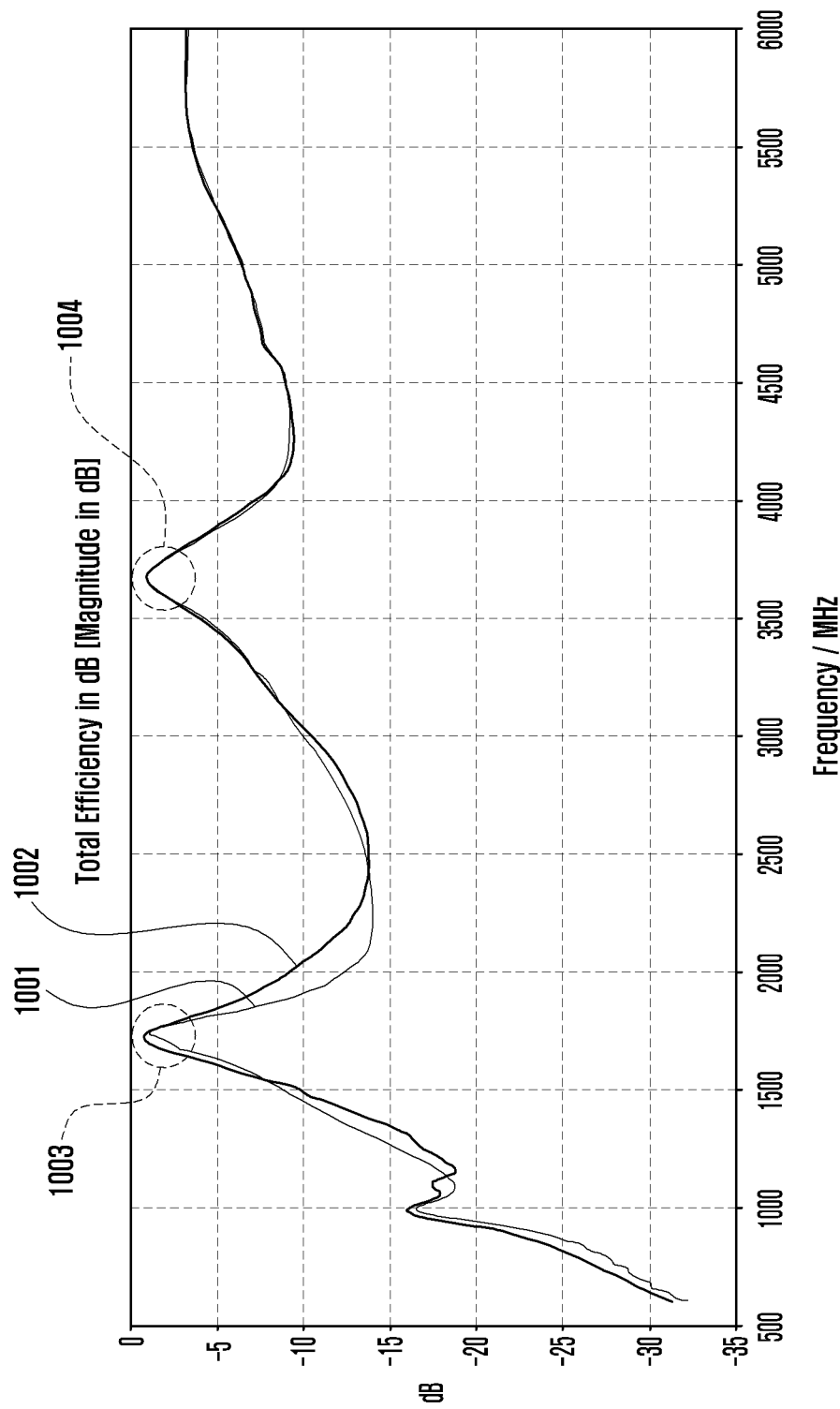
FIG. 10 is a graph illustrating radiation efficiency of an antenna in a slide-in state and a slide-out state of an electronic device according to an embodiment of the disclosure.

FIG. 10 is a graph illustrating radiation efficiency of an antenna in a slide-in state and a slide-out state of an electronic device according to an embodiment of the disclosure.

Referring to FIG. 10, in the slide-in state (graph 1001) (e.g., the state of FIG. 8A) and the slide-out state (graph 1002) (e.g., the state of FIG. 8B) of the electronic device 200 including the conductive wall 270, it can be seen that the first antenna A1 operating through the first conductive part 311 continuously maintains a designated radiation performance without a deviation in designated frequency bands (areas 1003 and 1004).

Figure 11:
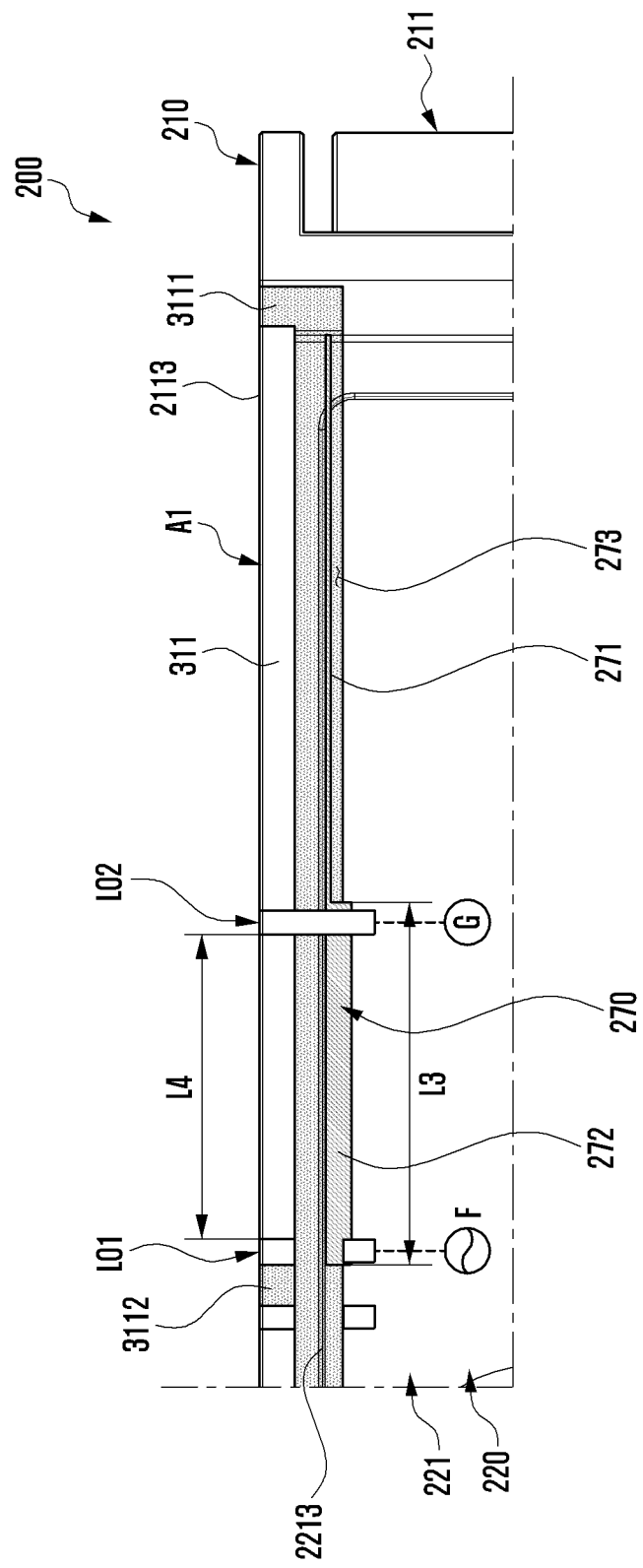
FIG. 11 is a diagram of a partial constitution of an electronic device illustrating disposition of a conductive wall according to an embodiment of the disclosure.

FIG. 11 is a diagram of a partial constitution of an electronic device illustrating disposition of a conductive wall according to an embodiment of the disclosure.

Referring to FIG. 11, the electronic device 200 may include a first housing 210 including a first side member 211, a second housing 220 disposed to slide-in/slide-out from the first housing 210 and including a second side member 221, and a flexible display 230 disposed to receive support from the first housing 210 and the second housing 220. According to an embodiment, the electronic device 200 may include a first conductive part 311 disposed through at least a portion of the third side surface 2113 of the first side member 211. According to an embodiment, the first conductive part 311 may be disposed adjacent to the sixth side surface 2213 of the second housing 220 disposed to correspond to the third side surface 2113. According to an embodiment, the first conductive part 311 may be segmented through the first non-conductive part 3111 and the second non-conductive part 3112 spaced apart by a predetermined interval from the first non-conductive part 3111. According to an embodiment, the first conductive part 311 may be electrically connected to a wireless communication circuit F (e.g., the wireless communication module 192 of FIG. 1) in a first location LO1 between the first non-conductive part 3111 and the second non-conductive part 3112. According to an embodiment, the first conductive part 311 may be electrically connected to a ground G at a second location LO2 between the first location LO1 and the second non-conductive part 3112. According to an embodiment, the wireless communication circuit F and the ground G may be disposed in the substrate (e.g., the substrate 250 of FIG. 4) included in the first housing 210. In this case, the substrate 250 and the first conductive part 311 may be electrically connected through an electrical connection member (e.g., C-clip or conductive tape). In some embodiments, the first conductive part 311 may be electrically connected to the substrate 250 through a partial shape change thereof.

According to various embodiments, the electronic device 200 may include a conductive wall 270 disposed between the third side surface 2113 and the sixth side surface 2213 and fixed to the first housing 210. According to an embodiment, when the first housing 210 is viewed from the outside, the conductive wall 270 may include a plate part 271 having a size and shape overlapped with at least the first conductive part 311 and a bent part 272 bent at a specified angle from the plate part 271 and fixed through at least a portion of the first housing 210. According to an embodiment, the conductive wall 270 may include a bent part 272 having a length L3 smaller than a length of the plate part 271 and an omitted part 273 of the bent part 272. In this case, the length L3 of the bent part may be formed equal to or longer than a length L4 from the first location LO1 to the second location LO2.

Figure 12:
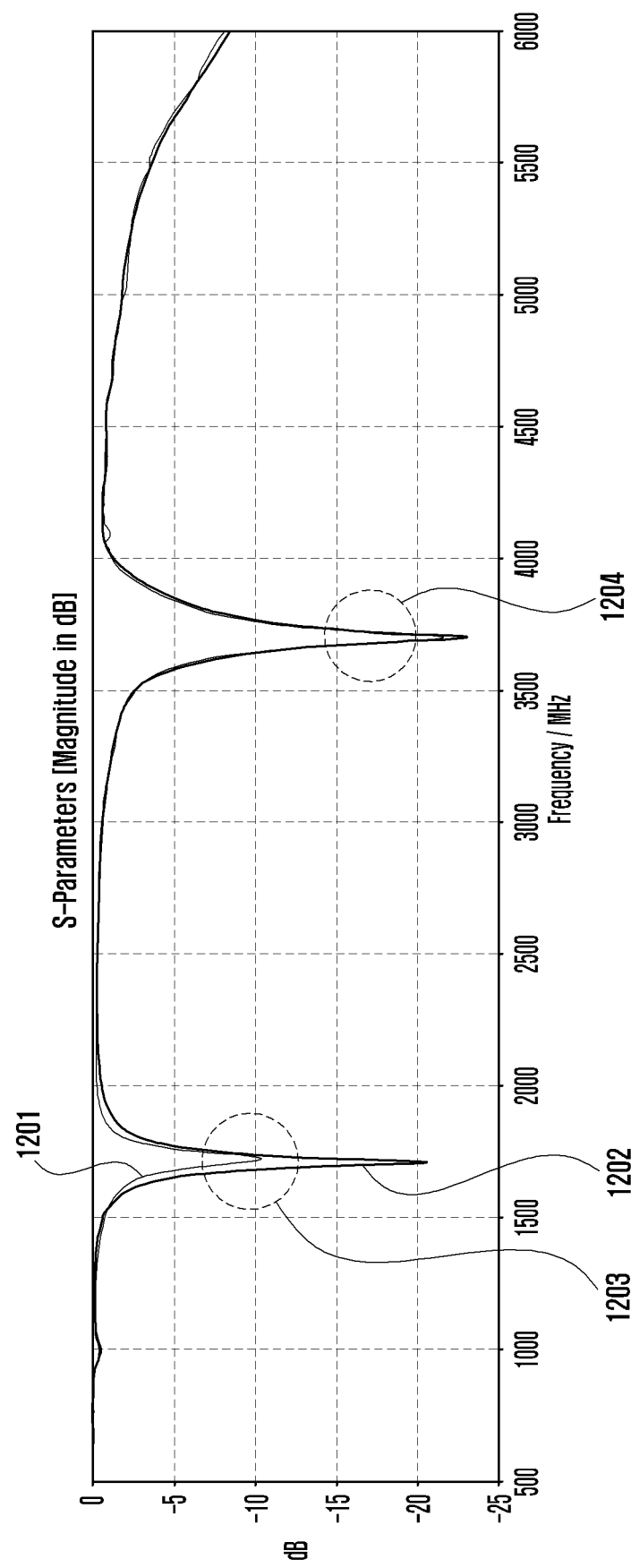
FIG. 12 is a graph illustrating a radiation performance of an antenna in a slide-in state and a slide-out state of the electronic device of FIG. 11 according to an embodiment of the disclosure.

FIG. 12 is a graph illustrating a radiation performance (s-parameters) of an antenna in a slide-in state and a slide-out state of the electronic device of FIG. 11 according to an embodiment of the disclosure.

Referring to FIG. 12, in a slide-in state (graph 1201) and a slide-out state (graph 1202) of the electronic device 200 including the conductive wall 270, it can be seen that the first antenna A1 operating through the first conductive part 311 continuously maintains a designated radiation performance without a deviation in designated frequency bands (areas 1203 and 1204).

Figure 13A:
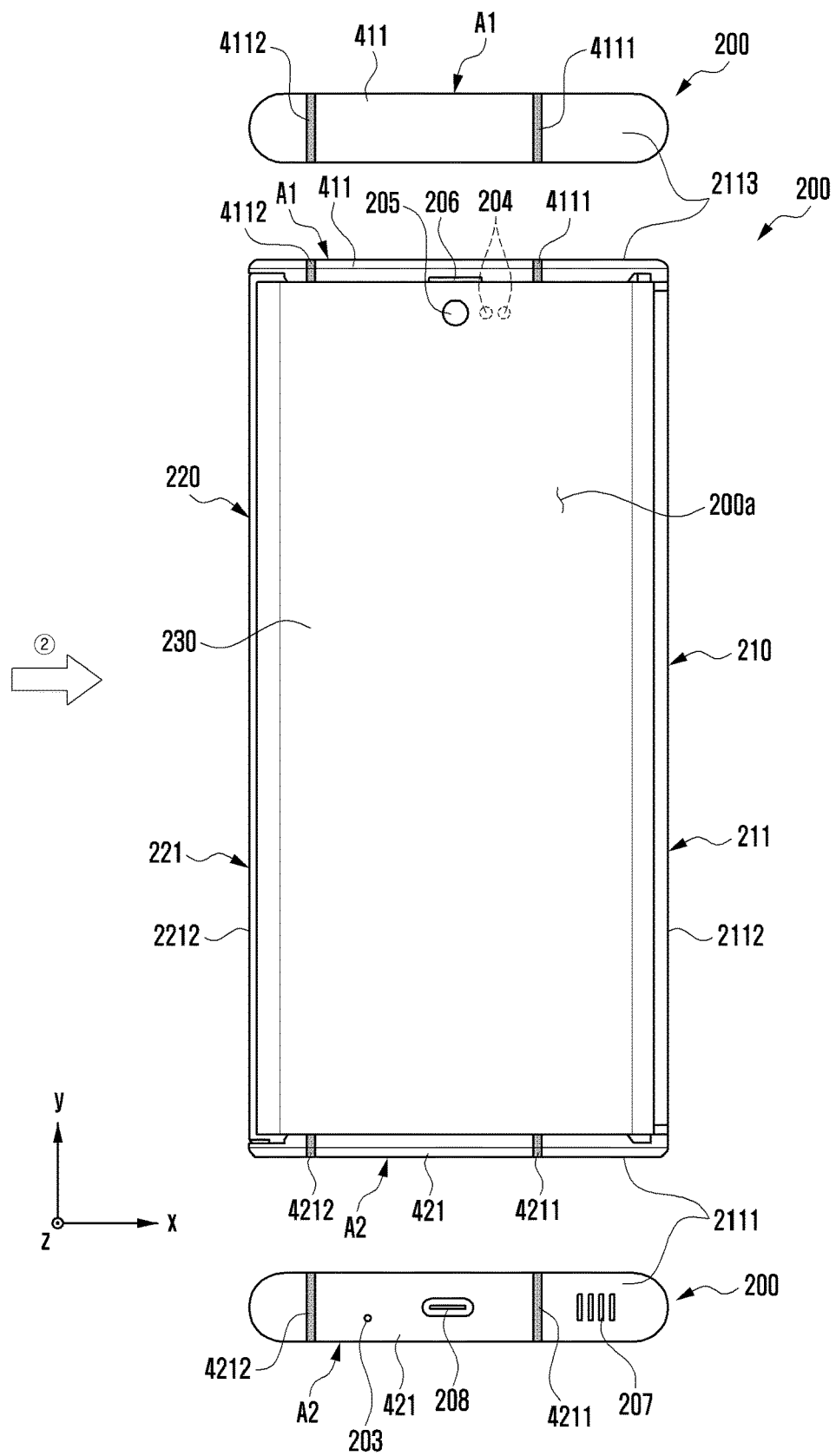
FIGS. 13A and 13B are diagrams illustrating a front surface and a rear surface of an electronic device in a slide-in state according to various embodiments of the disclosure.
Figure 13B:
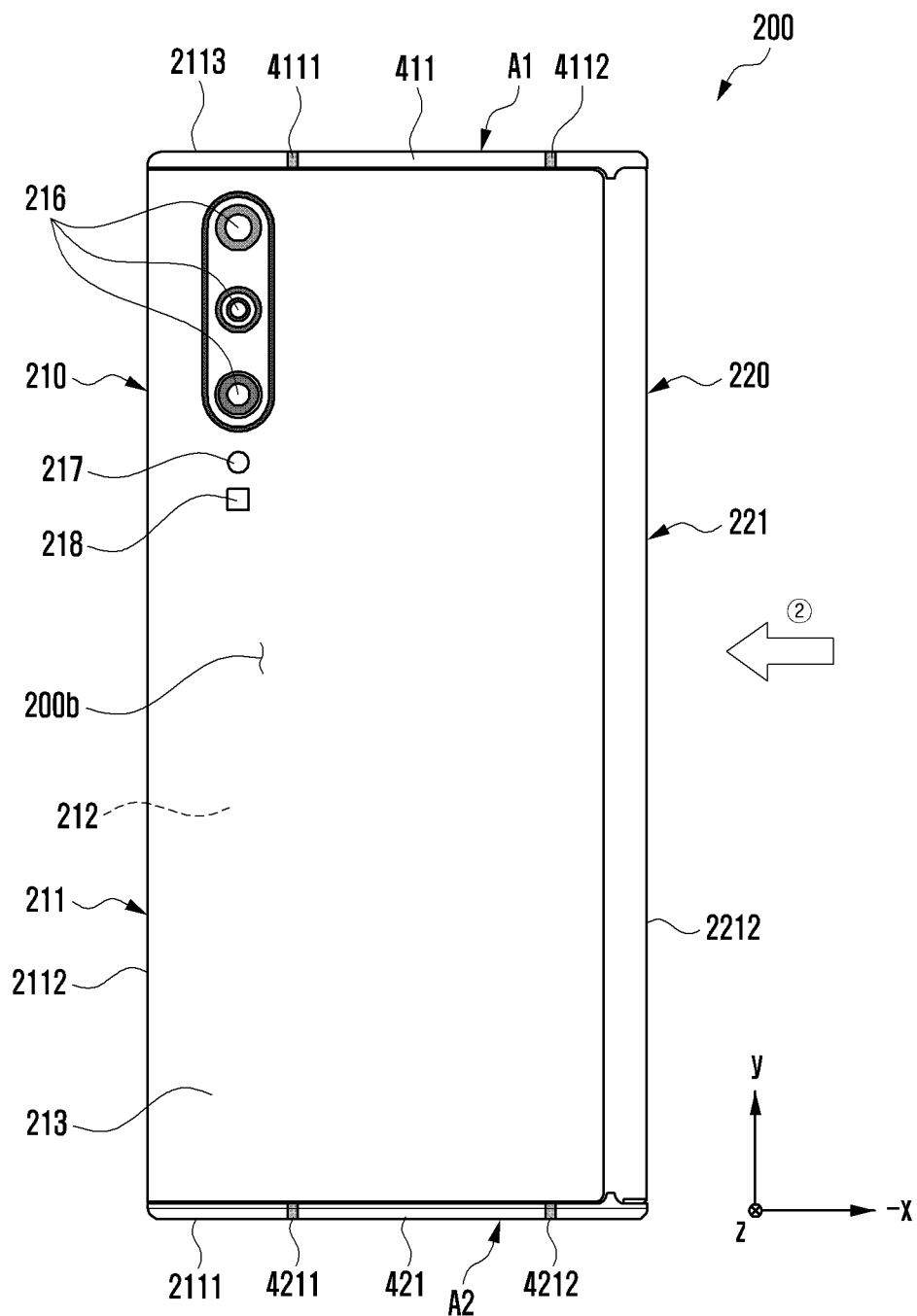

FIGS. 13A and 13B are diagrams illustrating a front surface and a rear surface of an electronic device in a slide-in state according to various embodiments of the disclosure.

In describing the electronic device of FIGS. 13A and 13B, the same reference numerals are assigned to substantially the same components as those of the electronic device of FIGS. 2A and 2B, and a detailed description thereof may be omitted.

Referring to FIGS. 13A and 13B, the electronic device 200 may include at least one antenna A1 and A2 electrically connected to a wireless communication circuit (e.g., the wireless communication module 192 of FIG. 1) disposed in the first housing 210. According to an embodiment, the at least one antenna A1 and A2 may include a first antenna A1 disposed in an upper area of the electronic device 200 and a second antenna A2 disposed in a lower area of the electronic device 200. According to an embodiment, the first antenna A1 may include a first conductive part 411 segmented through at least one non-conductive part 4111 and 4112 at the third side surface 2113 of the first side member 211. According to an embodiment, the first conductive part 411 may be disposed to be segmented through the first non-conductive part 4111 and the second non-conductive part 4112 spaced apart by a predetermined interval, and be electrically connected to the wireless communication circuit (e.g., the wireless communication module 192 of FIG. 1). According to an embodiment, the second antenna A2 may include a second conductive part 421 segmented through at least one non-conductive part 4211 and 4212 at the first side surface 2111 of the first side member 211. According to an embodiment, the second conductive part 421 may be disposed to be segmented through the third non-conductive part 4211 and the fourth non-conductive part 4212 spaced apart by a predetermined interval, and be electrically connected to the wireless communication circuit (e.g., the wireless communication module 192 of FIG. 1). According to an embodiment, the non-conductive parts 4111, 4112, 4211, and 4212 may include a first conductive part 411 and/or a second conductive part 421 and an injection-molded product. According to an embodiment, the first non-conductive part 4111 and/or the second non-conductive part 4112 may be formed in a rectangular shape through the non-conductive parts 4111, 4112, 4211, and 4212. According to an embodiment, the first non-conductive part 4111 or the second non-conductive part 4112 may be formed in a 'U' shape, as in the electronic device of FIG. 2A through the non-conductive parts 4111, 4112, 4211, and 4212. According to an embodiment, the wireless communication circuit (e.g., the wireless communication module 192 of FIG. 1) may be configured to transmit and/or receive a wireless signal in a designated frequency band (e.g., about 800 MHz-6000 MHz) through the first conductive part 411 and/or the second conductive part 421.

According to various embodiments, at least a portion of the second housing 220 may be made of a conductive material. For example, at least a portion of the sixth side surface 2213, the fourth side surface 2211, or the second support member 222 of the second housing 220 may be made of a conductive material, and be close to be coupled to the first conductive part 411 and/or the second conductive part 421 used as the antennas A1 and A2 in a slide-in state of the electronic device 200 and be being spaced apart from the first conductive part 411 and/or the second conductive part 421 in the slide-out state of the electronic device 200; thus, a deviation may occur in a radiation performance of the antenna, and a performance of the antenna may be reduced.

According to an embodiment of the disclosure, the electronic device 200 includes a conductive wall (e.g., the conductive wall 270 of FIG. 4) disposed between the third side surface 2113 of the first housing 210 and the sixth side surface 2213 of the second housing 220, thereby helping the first antenna A1 to exhibit a specified radiation performance regardless of a slide-in/slide-output operation thereof. Similarly, the electronic device 200 includes a conductive wall (e.g., conductive wall (e.g., the conductive wall 270 of FIG. 4) disposed in substantially the same manner between the first side surface 2111 of the first housing 210 and the fourth side surface 2211 of the second housing 220, thereby helping the second antenna A2 to exhibit a specified radiation performance regardless of a slide-in/slide-output operation thereof.

According to various embodiments, an electronic device (e.g., the electronic device 200 of FIG. 3A) may include a first housing (e.g., the first housing 210 of FIG. 3A) including a conductive part (e.g., the first conductive part 311 of FIG. 3A) formed through at least a portion of the first side member (e.g., the first side member 211 of FIG. 3A) and a first space (e.g., the first space 2101 of FIG. 3A); a second housing (e.g., the second housing 220 of FIG. 3A) slidably coupled to the first housing in a first direction (e.g., the x-axis direction of FIG. 3A), at least partially overlapped with the first side member in a slide-in state, and including a second side member (e.g., the second side member 221 of FIG. 3A) including a second space (e.g., the second space 2201 of FIG. 3A); a flexible display (e.g., the flexible display 230 of FIG. 3A) disposed to receive support from the first housing and the second housing and in which a display area at least partially varies when the electronic device is changed from the slide-in state to a slide-out state; a wireless communication circuit (e.g., the wireless communication module 192 of FIG. 1) disposed in the first space and configured to transmit and/or receive a wireless signal in at least one frequency band through the conductive part; and a conductive wall or a conductive plate (e.g., the conductive wall 270 of FIG. 4) fixed to at least a portion of the first housing and disposed to be electrically connected to a ground between the first side member and the second side member, wherein the conductive wall is disposed to overlap the conductive part when the first side member is viewed from the outside.

According to various embodiments, the conductive wall may have a shape overlapped with the conductive part when the first side member is viewed from the outside in the slide-in state.

According to various embodiments, the conductive wall may be spaced apart from the second housing.

According to various embodiments, the first side member may include a first side surface having a first length in a direction parallel to the first direction; a second side surface extended from the first side surface in a second direction perpendicular to the first direction and having a second length longer than the first length; a third side surface extended from the second side surface in a direction parallel to the first side surface and having the first length; and a first support member extended from at least a portion of the first side surface, the second side surface, and/or the third side surface to the first space, wherein the conductive part may be disposed at the first side surface so as to be segmented through at least one non-conductive part.

According to various embodiments, the second side member may include a fourth side surface at least partially corresponding to the first side surface in the slide-in state; a fifth side surface extended in the second direction from the fourth side surface; a sixth side surface extended in a direction parallel to the fourth side surface from the fifth side surface and configured to at least partially face the third side surface in the slide-in state; and a second support member extended from at least a portion of the fourth side surface, the fifth side surface, and/or the sixth side surface to the second space, wherein at least a portion of the fourth side surface and/or the second support member may be made of a conductive material.

According to various embodiments, the conductive wall may include a plate part having a length overlapped with at least the conductive part when the first side surface is viewed from the outside; and a bent part bent from at least a portion of the plate part.

According to various embodiments, the bent part may be fixed to at least a portion of the first side member so that the plate part is located between the first side surface and the fourth side surface.

According to various embodiments, the plate part may be spaced apart by a specified interval from the conductive part disposed at the first side surface.

According to various embodiments, the plate part and the bent part may have substantially the same length.

According to various embodiments, the conductive wall may be electrically connected to the ground through one end and the other end.

According to various embodiments, the plate part and the bent part may have different lengths.

According to various embodiments, the conductive part may be electrically connected to the wireless communication circuit through a first point, and be electrically connected to the ground through a second point spaced apart from the first point.

According to various embodiments, the bent part may have at least an extended length from the first point to the second point.

According to various embodiments, the conductive wall may be electrically connected to the ground in at least one designated location corresponding to a section from the first point to the second point.

According to various embodiments, the conductive wall may be fixed to at least a portion of the first side member in at least one designated location corresponding to a section from the first point to the second point.

According to various embodiments, at least a portion of the bent part of the conductive wall may be fixed to at least a portion of the first side member through welding or conductive bonding.

According to various embodiments, a width of the plate part of the conductive wall may be formed larger than that of at least the fourth side surface when the first side surface is viewed from the outside.

According to various embodiments, the electronic device may further include a substrate disposed in the first space and including the wireless communication circuit and the ground.

According to various embodiments, the electronic device includes a first housing including a first conductive part; a second housing slidably coupled to the first housing in a first direction, at least partially overlapped with the first housing in a slide-in state, and including at least one conductive structure; a flexible display disposed to receive support from the first housing and the second housing and in which a display area at least partially varies when the electronic device is changed from the slide-in state to the slide-out state; a wireless communication circuit disposed in an internal space of the first housing and configured to transmit and/or receive a wireless signal in at least one frequency band through the first conductive part; and a conductive wall disposed in the first housing to correspond to the first conductive part between the first housing and the second housing and electrically connected to a ground, wherein the conductive wall has a shape overlapped with the at least one conductive part in an area corresponding to the first conductive part when the first housing is viewed from the outside.

According to various embodiments, the at least one conductive structure may include at least one of a second conductive part disposed in at least a portion of the second housing, a conductive driving structure disposed in an internal space of the second housing, or a conductive plate included in the flexible display.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
   a first housing including a first space and a conductive part formed through at least a portion of a first side member;
   a second housing slidably coupled to the first housing in a first direction, at least partially overlapped with the first side member in a slide-in state, and including a second side member including a second space;
   a flexible display disposed to receive support from the first housing and the second housing and in which a display area at least partially varies when the electronic device is changed from the slide-in state to a slide-out state;
   a wireless communication circuit disposed in the first space and configured to transmit or receive a wireless signal in at least one frequency band through the conductive part; and
   a conductive wall fixed to at least a portion of the first housing and being electrically connected to a ground,
   wherein the conductive wall is disposed between the first side member and the second side member,
   wherein the conductive wall overlaps the second side member in an area corresponding to the conductive part when the first side member is viewed from outside of the electronic device in the slide-in state, and
   wherein the conductive wall is connected to the ground of the electronic device in both the slide-in state and the slide-out state.

2. The electronic device of claim 1, wherein the conductive wall has a shape overlapped with the conductive part when the first side member is viewed from the outside of the electronic device in the slide-in state.

3. The electronic device of claim 1, wherein the conductive wall is spaced apart from the second housing.

4. The electronic device of claim 1,
   wherein the first side member comprises:
      a first side surface having a first length in a direction parallel to the first direction;
      a second side surface extended from the first side surface in a second direction perpendicular to the first direction and having a second length longer than the first length;
      a third side surface extended from the second side surface in a direction parallel to the first side surface and having the first length; and
      a first support member extended from at least a portion of the first side surface, the second side surface, or the third side surface to the first space, and
   wherein the conductive part is disposed at the first side surface so as to be segmented through at least one non-conductive part.

5. The electronic device of claim 4,
   wherein the second side member comprises:
      a fourth side surface at least partially corresponding to the first side surface in the slide-in state;
      a fifth side surface extended from the fourth side surface in the second direction;
      a sixth side surface extended from the fifth side surface in a direction parallel to the fourth side surface and configured to at least partially face the third side surface in the slide-in state; and
      a second support member extended from at least a portion of the fourth side surface, the fifth side surface, or the sixth side surface to the second space, and
   wherein at least a portion of the fourth side surface or at least a portion of the second support member is made of a conductive material.

6. The electronic device of claim 5, wherein a plate part has a length overlapped with at least the conductive part when the first side surface is viewed from the outside of the electronic device.

7. The electronic device of claim 6, wherein a bent part is fixed to at least a portion of the first side member so that the plate part is located between the first side surface and the fourth side surface.

8. The electronic device of claim 7, wherein the plate part is spaced apart by a specified interval from the conductive part disposed at the first side surface.

9. The electronic device of claim 7, wherein the plate part and the bent part have substantially a same length.

10. The electronic device of claim 9, wherein the conductive wall is electrically connected to the ground through a first end and a second end.

11. The electronic device of claim 7, wherein the plate part and the bent part have different lengths.

12. The electronic device of claim 11,
    wherein the conductive part is electrically connected to the wireless communication circuit through a first point, and
    wherein the conductive part is electrically connected to the ground through a second point spaced apart from the first point.

13. The electronic device of claim 12, wherein the bent part has at least an extended length from the first point to the second point.

14. The electronic device of claim 13, wherein the conductive wall is electrically connected to the ground in at least one designated location corresponding to a section from the first point to the second point.

15. The electronic device of claim 14, wherein the conductive wall is fixed to at least a portion of the first side member in at least one designated location corresponding to a section from the first point to the second point.

16. The electronic device of claim 7, wherein at least a portion of the bent part of the conductive wall is fixed to at least a portion of the first side member through welding or conductive bonding.

17. The electronic device of claim 7, wherein a width of the plate part of the conductive wall is formed larger than at least that of the fourth side surface when the first side surface is viewed from the outside of the electronic device.

18. The electronic device of claim 1, further comprising:
a substrate disposed in the first space and including the wireless communication circuit and the ground.

19. The electronic device of claim 1, wherein the conductive wall comprises a plate part and a bent part, wherein the bent part is perpendicular to the plate part and is bent from at least a portion of the plate part, and wherein the plate part is disposed in a floating state between the first side member of the first housing and the second side member of the second housing.

20. The electronic device of claim 19, wherein the bent part is fixed to a portion of the first side member and is electrically connected to the ground.

21. An electronic device, comprising:
a first housing including a first conductive part;
a second housing slidably coupled to the first housing in a first direction, at least partially overlapped with the first housing in a slide-in state, and including at least one conductive structure;
a flexible display disposed to receive support from the first housing and the second housing and in which a display area at least partially varies when the electronic device is changed from the slide-in state to a slide-out state;
a wireless communication circuit disposed in an internal space of the first housing and configured to at least one of transmit or receive a wireless signal in at least one frequency band through the first conductive part; and
a conductive wall disposed in the first housing to correspond to the first conductive part,
wherein the conductive wall is disposed between the first housing and the second housing and is electrically connected to a ground,
wherein the conductive wall has a shape overlapped with the first conductive part when the first housing is viewed from outside of the electronic device in the slide-in state, and
wherein the conductive wall is connected to the ground of the electronic device in both the slide-in state and the slide-out state.

22. The electronic device of claim 21, wherein the at least one conductive structure comprises at least one of a second conductive part disposed in at least a portion of the second housing, a conductive driving structure disposed in an internal space of the second housing, or a conductive plate included in the flexible display.

* * * * *